United States Patent
Yang et al.

(10) Patent No.: US 11,159,222 B2
(45) Date of Patent: Oct. 26, 2021

(54) CHANNEL STATE INFORMATION OPERATIONS FOR ULTRA-RELIABLE LOW LATENCY COMMUNICATIONS

(71) Applicant: QUALCOMM Incorporated, San Diego, CA (US)

(72) Inventors: Wei Yang, San Diego, CA (US); Seyedkianoush Hosseini, San Diego, CA (US); Chih Ping Li, San Diego, CA (US); Wanshi Chen, San Diego, CA (US); Gabi Sarkis, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/280,891

(22) Filed: Feb. 20, 2019

(65) Prior Publication Data

US 2019/0268059 A1      Aug. 29, 2019

Related U.S. Application Data

(60) Provisional application No. 62/635,995, filed on Feb. 27, 2018.

(51) Int. Cl.
*H04B 7/06* (2006.01)
*H04L 1/18* (2006.01)
(Continued)

(52) U.S. Cl.
CPC ........... *H04B 7/0641* (2013.01); *H04B 7/063* (2013.01); *H04B 7/0623* (2013.01);
(Continued)

(58) Field of Classification Search
CPC .. H04B 7/0641; H04B 7/0647; H04B 7/0632; H04B 7/0626; H04B 7/0639;
(Continued)

(56) References Cited

U.S. PATENT DOCUMENTS

2015/0215090 A1    7/2015  Sayana et al.
2016/0156447 A1    6/2016  Kim et al.
(Continued)

FOREIGN PATENT DOCUMENTS

WO       2017075802 A1    5/2017

OTHER PUBLICATIONS

Partial International Search Report—PCT/US2019/018998—ISA/EPO—dated Apr. 29, 2019.
(Continued)

*Primary Examiner* — Fitwi Y Hailegiorgis
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may determine to report first channel state information (CSI), wherein the first CSI is associated with a parameter that indicates a priority of the first CSI. The UE may prioritize the first CSI over a second CSI based at least in part on the parameter. The UE may transmit an indication of the first CSI and may drop the second CSI based at least in part on prioritizing the first CSI over the second CSI. Numerous other aspects are provided.

30 Claims, 14 Drawing Sheets

(51) Int. Cl.
  *H04L 1/00* (2006.01)
  *H04L 5/00* (2006.01)
  *H04W 24/10* (2009.01)

(52) U.S. Cl.
  CPC ......... *H04B 7/0626* (2013.01); *H04B 7/0632* (2013.01); *H04B 7/0639* (2013.01); *H04B 7/0647* (2013.01); *H04B 7/0652* (2013.01); *H04L 1/0003* (2013.01); *H04L 1/1812* (2013.01); *H04L 5/0057* (2013.01); *H04W 24/10* (2013.01); *H04L 5/001* (2013.01); *H04L 5/0048* (2013.01)

(58) Field of Classification Search
  CPC .... H04B 7/0623; H04B 7/063; H04B 7/0652; H04L 5/0057; H04L 1/1812; H04L 1/0003; H04L 5/0048; H04L 5/001; H04W 24/10
  USPC .................................................. 375/267, 260
  See application file for complete search history.

(56) References Cited

U.S. PATENT DOCUMENTS

2016/0295573 A1* 10/2016 Lee ........................ H04L 1/1812
2018/0035332 A1    2/2018 Agiwal et al.
2019/0229780 A1*  7/2019 Kim ..................... H04B 7/0626
2019/0349052 A1* 11/2019 Yum ..................... H04W 24/10

OTHER PUBLICATIONS

International Search Report and Written Opinion—PCT/US2019/018998—ISA/EPO—dated Jun. 24, 2019.

* cited by examiner

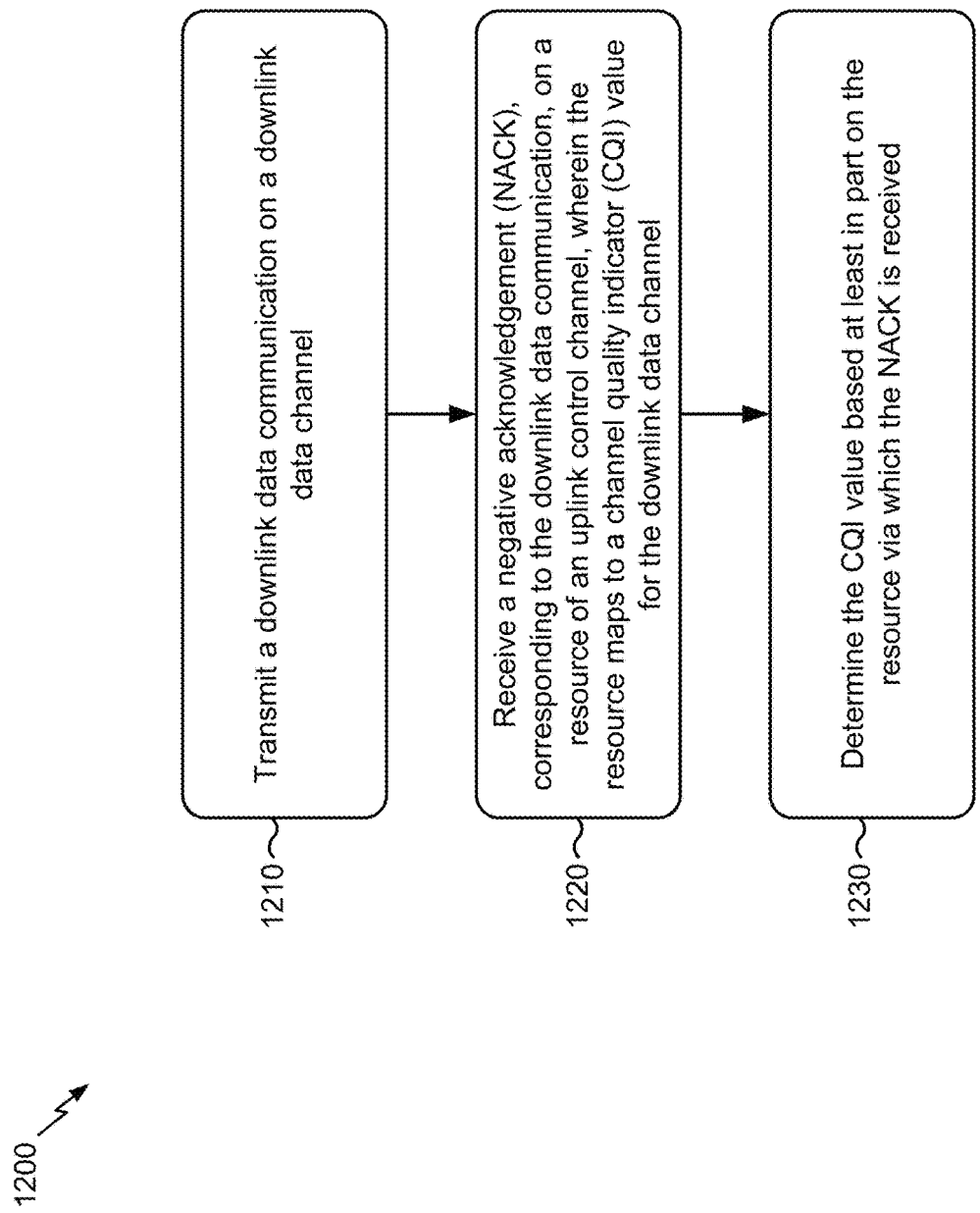

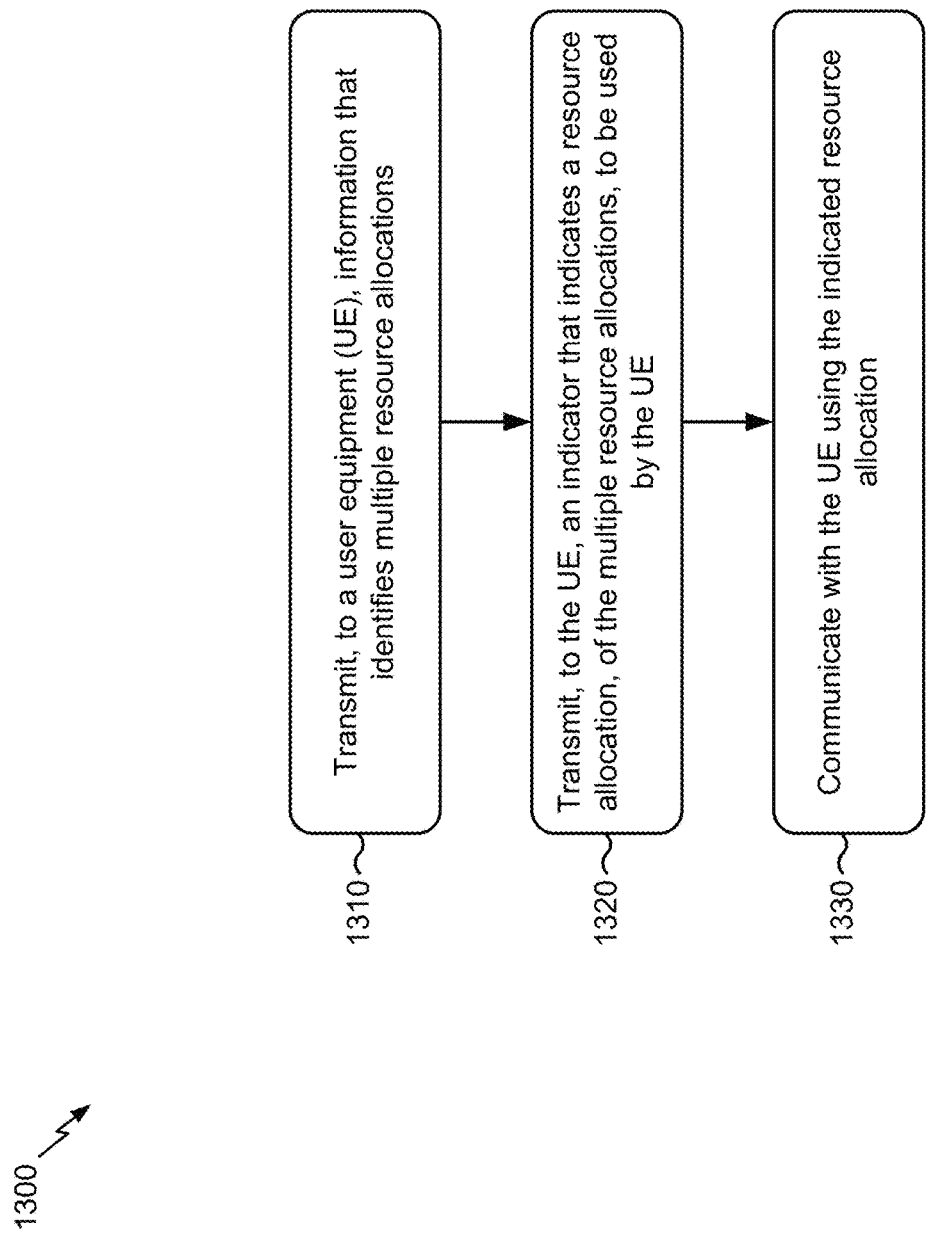

CHANNEL STATE INFORMATION OPERATIONS FOR ULTRA-RELIABLE LOW LATENCY COMMUNICATIONS

CROSS-REFERENCE TO RELATED APPLICATIONS UNDER 35 U.S.C. § 119

This application claims priority to U.S. Provisional Patent Application No. 62/635,995, filed on Feb. 27, 2018, entitled "TECHNIQUES AND APPARATUSES FOR CHANNEL STATE INFORMATION OPERATIONS FOR ULTRA-RELIABLE LOW LATENCY COMMUNICATIONS," which is hereby expressly incorporated by reference herein.

FIELD OF THE DISCLOSURE

Aspects of the present disclosure generally relate to wireless communication, and more particularly to techniques and apparatuses for channel state information (CSI) operations for ultra-reliable low latency communications (URLLC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining to report first channel state information (CSI), wherein the first CSI is associated with a parameter that indicates a priority of the first CSI; prioritizing the first CSI over a second CSI based at least in part on the parameter; and transmitting an indication of the first CSI and dropping the second CSI based at least in part on prioritizing the first CSI over the second CSI.

In some aspects, a user equipment for wireless communication may include memory and one or more processors operatively coupled to the memory. The memory and the one or more processors may be configured to determine to report first channel state information (CSI), wherein the first CSI is associated with a parameter that indicates a priority of the first CSI; prioritize the first CSI over a second CSI based at least in part on the parameter; and transmit an indication of the first CSI and drop the second CSI based at least in part on prioritizing the first CSI over the second CSI.

In some aspects, a non-transitory computer-readable medium may store one or more instructions for wireless communication. The one or more instructions, when executed by one or more processors of a user equipment, may cause the one or more processors to determine to report first channel state information (CSI), wherein the first CSI is associated with a parameter that indicates a priority of the first CSI; prioritize the first CSI over a second CSI based at least in part on the parameter; and transmit an indication of the first CSI and drop the second CSI based at least in part on prioritizing the first CSI over the second CSI.

In some aspects, an apparatus for wireless communication may include means for determining to report first channel state information (CSI), wherein the first CSI is associated with a parameter that indicates a priority of the first CSI; means for prioritizing the first CSI over a second CSI based at least in part on the parameter; and means for transmitting an indication of the first CSI and dropping the second CSI based at least in part on prioritizing the first CSI over the second CSI.

In some aspects, a method of wireless communication, performed by a user equipment (UE), may include determining that a downlink data communication, received on a downlink data channel, was not successfully decoded; determining a channel quality indicator (CQI) value for the downlink data channel; identifying a resource, for transmission of a negative acknowledgement (NACK) on an uplink control channel, based at least in part on the CQI value; and transmitting the NACK, corresponding to the downlink data communication, using the identified resource, wherein transmission of the NACK using the resource implicitly indicates the CQI value.

In some aspects, a user equipment for wireless communication may include memory and one or more processors operatively coupled to the memory. The memory and the one or more processors may be configured to determine that a downlink data communication, received on a downlink data channel, was not successfully decoded; determine a channel quality indicator (CQI) value for the downlink data channel; identify a resource, for transmission of a negative acknowledgement (NACK) on an uplink control channel, based at least in part on the CQI value; and transmit the NACK, corresponding to the downlink data communication, using the identified resource, wherein transmission of the NACK using the resource implicitly indicates the CQI value.

In some aspects, a non-transitory computer-readable medium may store one or more instructions for wireless communication. The one or more instructions, when executed by one or more processors of a user equipment, may cause the one or more processors to determine that a downlink data communication, received on a downlink data channel, was not successfully decoded; determine a channel quality indicator (CQI) value for the downlink data channel; identify a resource, for transmission of a negative acknowledgement (NACK) on an uplink control channel, based at least in part on the CQI value; and transmit the NACK, corresponding to the downlink data communication, using the identified resource, wherein transmission of the NACK using the resource implicitly indicates the CQI value.

In some aspects, an apparatus for wireless communication may include means for determining that a downlink data communication, received on a downlink data channel, was not successfully decoded; means for determining a channel quality indicator (CQI) value for the downlink data channel; means for identifying a resource, for transmission of a negative acknowledgement (NACK) on an uplink control channel, based at least in part on the CQI value; and means for transmitting the NACK, corresponding to the downlink data communication, using the identified resource, wherein transmission of the NACK using the resource implicitly indicates the CQI value.

In some aspects, a method of wireless communication, performed by a user equipment (UE), may include receiving information that identifies multiple resource allocations; receiving an indicator that indicates a resource allocation, of the multiple resource allocations, to be used by the UE; and communicating with a base station using the indicated resource allocation.

In some aspects, a user equipment (UE) for wireless communication may include memory and one or more processors operatively coupled to the memory. The memory and the one or more processors may be configured to receive information that identifies multiple resource allocations; receive an indicator that indicates a resource allocation, of the multiple resource allocations, to be used by the UE; and communicate with a base station using the indicated resource allocation.

In some aspects, a non-transitory computer-readable medium may store one or more instructions for wireless communication. The one or more instructions, when executed by one or more processors of a user equipment (UE), may cause the one or more processors to receive information that identifies multiple resource allocations; receive an indicator that indicates a resource allocation, of the multiple resource allocations, to be used by the UE; and communicate with a base station using the indicated resource allocation.

In some aspects, an apparatus for wireless communication may include means for receiving information that identifies multiple resource allocations; means for receiving an indicator that indicates a resource allocation, of the multiple resource allocations, to be used by the apparatus; and means for communicating with a base station using the indicated resource allocation.

In some aspects, a method of wireless communication, performed by a base station, may include transmitting, to a user equipment (UE), a request to report first channel state information (CSI), wherein the first CSI is associated with a parameter that indicates that the first CSI is higher priority than second CSI; receiving, from the UE, an indication of CSI; and determining that the indication includes the first CSI and excludes the second CSI based at least in part on the first CSI being higher priority than the second CSI.

In some aspects, a base station for wireless communication may include memory and one or more processors operatively coupled to the memory. The memory and the one or more processors may be configured to transmit, to a user equipment (UE), a request to report first channel state information (CSI), wherein the first CSI is associated with a parameter that indicates that the first CSI is higher priority than second CSI; receive, from the UE, an indication of CSI; and determine that the indication includes the first CSI and excludes the second CSI based at least in part on the first CSI being higher priority than the second CSI.

In some aspects, a non-transitory computer-readable medium may store one or more instructions for wireless communication. The one or more instructions, when executed by one or more processors of a base station, may cause the one or more processors to transmit, to a user equipment (UE), a request to report first channel state information (CSI), wherein the first CSI is associated with a parameter that indicates that the first CSI is higher priority than second CSI; receive, from the UE, an indication of CSI; and determine that the indication includes the first CSI and excludes the second CSI based at least in part on the first CSI being higher priority than the second CSI.

In some aspects, an apparatus for wireless communication may include means for transmitting, to a user equipment (UE), a request to report first channel state information (CSI), wherein the first CSI is associated with a parameter that indicates that the first CSI is higher priority than second CSI; means for receiving, from the UE, an indication of CSI; and means for determining that the indication includes the first CSI and excludes the second CSI based at least in part on the first CSI being higher priority than the second CSI.

In some aspects, a method of wireless communication, performed by a base station, may include transmitting a downlink data communication on a downlink data channel; receiving a negative acknowledgement (NACK), corresponding to the downlink data communication, on a resource of an uplink control channel, wherein the resource maps to a channel quality indicator (CQI) value for the downlink data channel; and determining the CQI value based at least in part on the resource via which the NACK is received.

In some aspects, a base station for wireless communication may include memory and one or more processors operatively coupled to the memory. The memory and the one or more processors may be configured to transmit a downlink data communication on a downlink data channel; receive a negative acknowledgement (NACK), corresponding to the downlink data communication, on a resource of an uplink control channel, wherein the resource maps to a channel quality indicator (CQI) value for the downlink data channel; and determine the CQI value based at least in part on the resource via which the NACK is received.

In some aspects, a non-transitory computer-readable medium may store one or more instructions for wireless communication. The one or more instructions, when executed by one or more processors of a base station, may cause the one or more processors to transmit a downlink data communication on a downlink data channel; receive a negative acknowledgement (NACK), corresponding to the downlink data communication, on a resource of an uplink control channel, wherein the resource maps to a channel quality indicator (CQI) value for the downlink data channel; and determine the CQI value based at least in part on the resource via which the NACK is received.

In some aspects, an apparatus for wireless communication may include means for transmitting a downlink data communication on a downlink data channel; means for receiving a negative acknowledgement (NACK), corresponding to the downlink data communication, on a resource of an uplink control channel, wherein the resource maps to a channel quality indicator (CQI) value for the downlink data channel; and means for determining the CQI value based at least in part on the resource via which the NACK is received.

In some aspects, a method of wireless communication, performed by a base station, may include transmitting, to a user equipment (UE), information that identifies multiple resource allocations; transmitting, to the UE, an indicator that indicates a resource allocation, of the multiple resource allocations, to be used by the UE; and communicating with the UE using the indicated resource allocation.

In some aspects, a base station for wireless communication may include memory and one or more processors operatively coupled to the memory. The memory and the one or more processors may be configured to transmit, to a user equipment (UE), information that identifies multiple resource allocations; transmit, to the UE, an indicator that indicates a resource allocation, of the multiple resource allocations, to be used by the UE; and communicate with the UE using the indicated resource allocation.

In some aspects, a non-transitory computer-readable medium may store one or more instructions for wireless communication. The one or more instructions, when executed by one or more processors of a base station, may cause the one or more processors to transmit, to a user equipment (UE), information that identifies multiple resource allocations; transmit, to the UE, an indicator that indicates a resource allocation, of the multiple resource allocations, to be used by the UE; and communicate with the UE using the indicated resource allocation.

In some aspects, an apparatus for wireless communication may include means for transmitting, to a user equipment (UE), information that identifies multiple resource allocations; means for transmitting, to the UE, an indicator that indicates a resource allocation, of the multiple resource allocations, to be used by the UE; and means for communicating with the UE using the indicated resource allocation.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-13 are diagrams illustrating example processes relating to CSI operations for URLLC, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
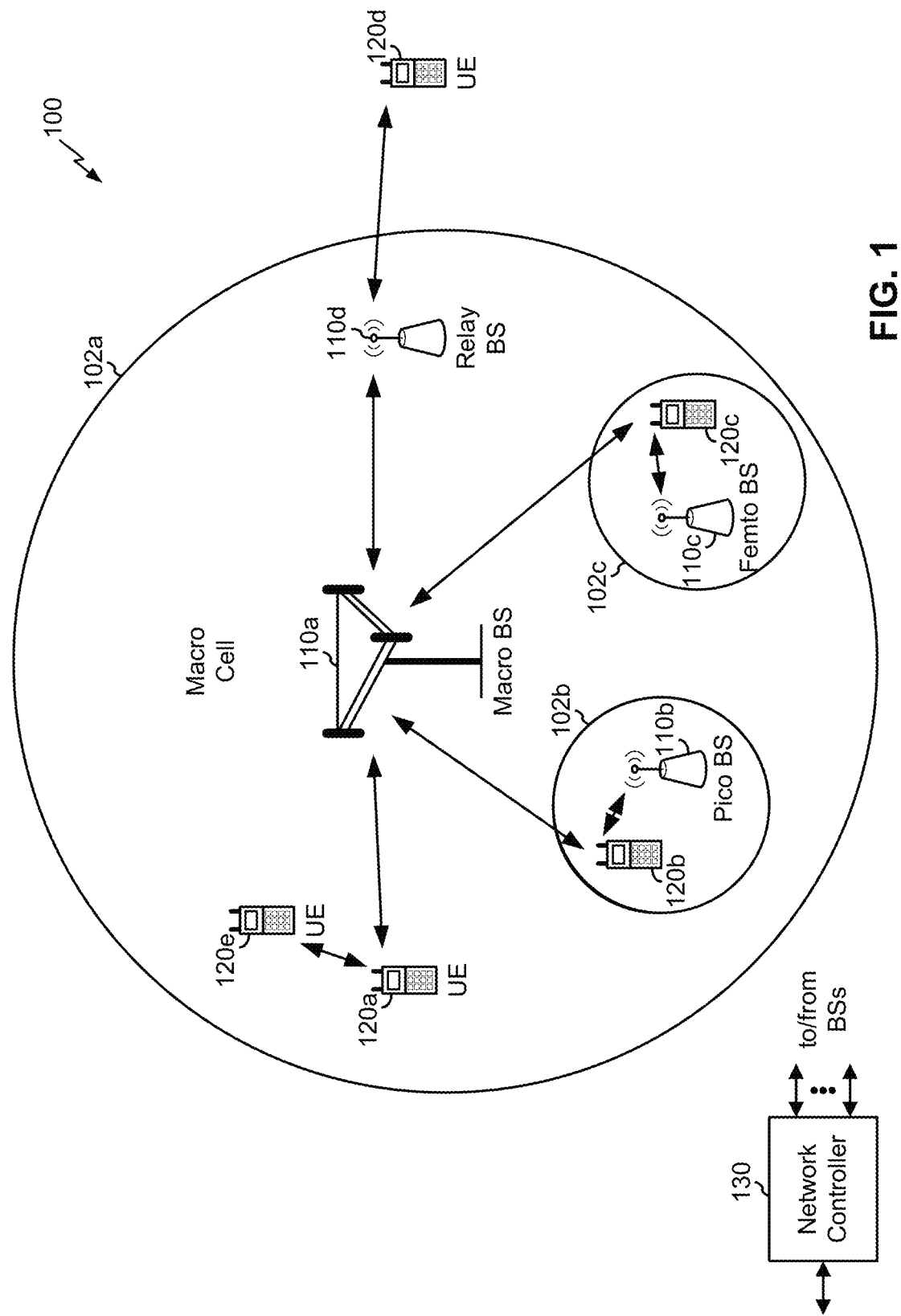
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of B Ss 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
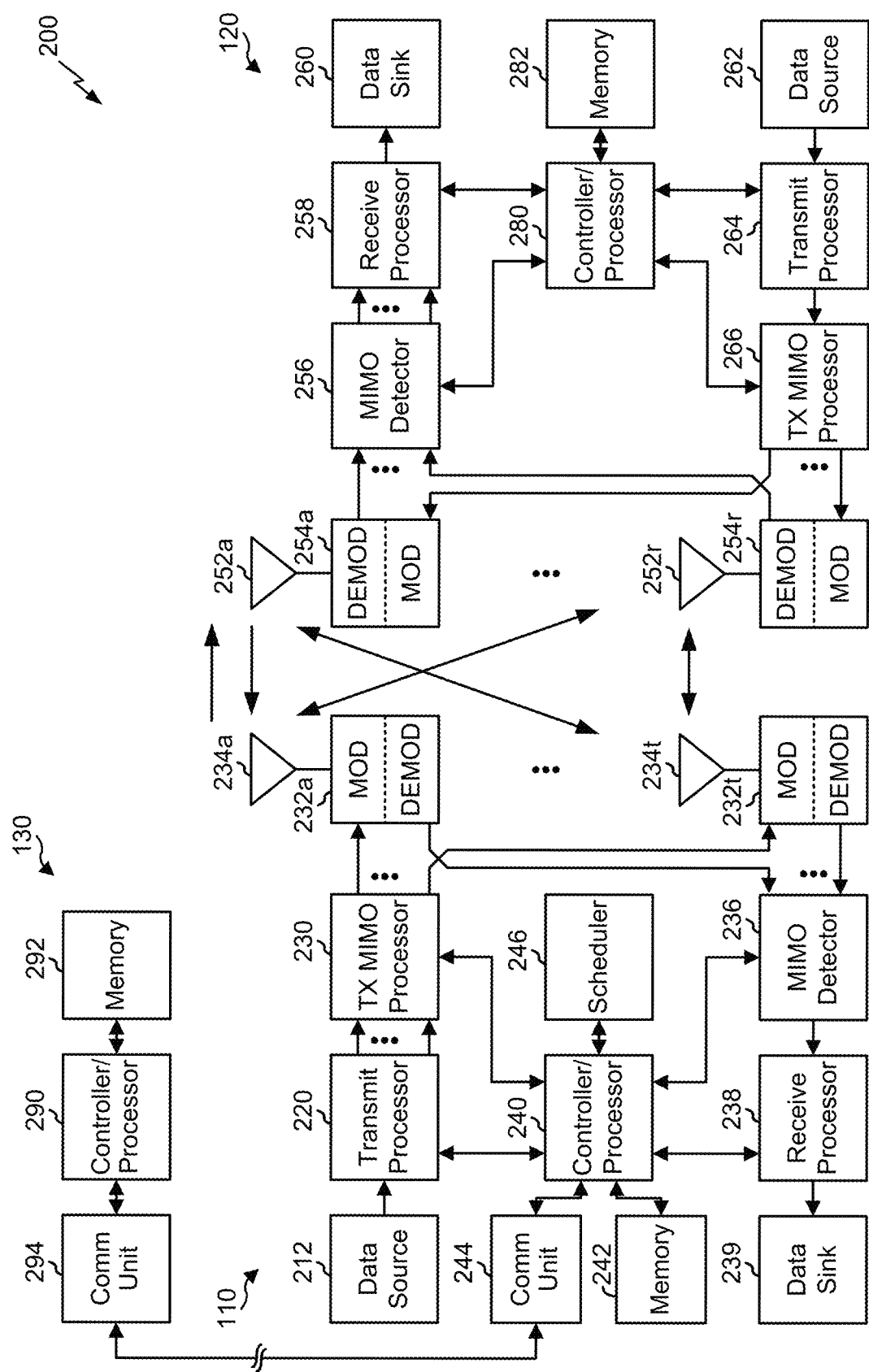
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with CSI operations for URLLC, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining to report first channel state information (CSI), wherein the first CSI is associated with a parameter that indicates a priority of the first CSI; means for prioritizing the first CSI over a second CSI based at least in part on the parameter; means for transmitting an indication of the first CSI and dropping the second CSI based at least in part on prioritizing the first CSI over the second CSI; and/or the like. Additionally, or alternatively, UE 120 may include means for determining that a downlink data communication, received on a downlink data channel, was not successfully decoded; means for determining a channel quality indicator (CQI) value for the downlink data channel; means for identifying a resource, for transmission of a negative acknowledgement (NACK) on an uplink control channel, based at least in part on the CQI value; means for transmitting the NACK, corresponding to the downlink data communication, using the identified resource, wherein transmission of the NACK using the resource implicitly indicates the CQI value; and/or the like. Additionally, or alternatively, UE 120 may include means for receiving information that identifies multiple resource allocations; means for receiving an indicator that indicates a resource allocation, of the multiple resource allocations, to be used by the apparatus; means for communicating with a base station using the indicated resource allocation; and/or the like. In some aspects, such means may include one or more components of UE 120 described in connection with FIG. 2.

In some aspects, base station 110 may include means for transmitting, to a user equipment (UE), a request to report first channel state information (CSI), wherein the first CSI is associated with a parameter that indicates that the first CSI is higher priority than second CSI; means for receiving, from the UE, an indication of CSI; means for determining that the indication includes the first CSI and excludes the second CSI based at least in part on the first CSI being higher priority than the second CSI; and/or the like. Additionally, or alternatively, base station 110 may include means for transmitting a downlink data communication on a downlink data channel; means for receiving a negative acknowledgement (NACK), corresponding to the downlink data communication, on a resource of an uplink control channel, wherein the resource maps to a channel quality indicator (CQI) value for the downlink data channel; means for determining the CQI value based at least in part on the resource via which the NACK is received; and/or the like. Additionally, or alternatively, base station 110 may include means for transmitting, to a user equipment (UE), information that identifies multiple resource allocations; means for transmitting, to the UE, an indicator that indicates a resource allocation, of the multiple resource allocations, to be used by the UE; means for communicating with the UE using the indicated resource allocation; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
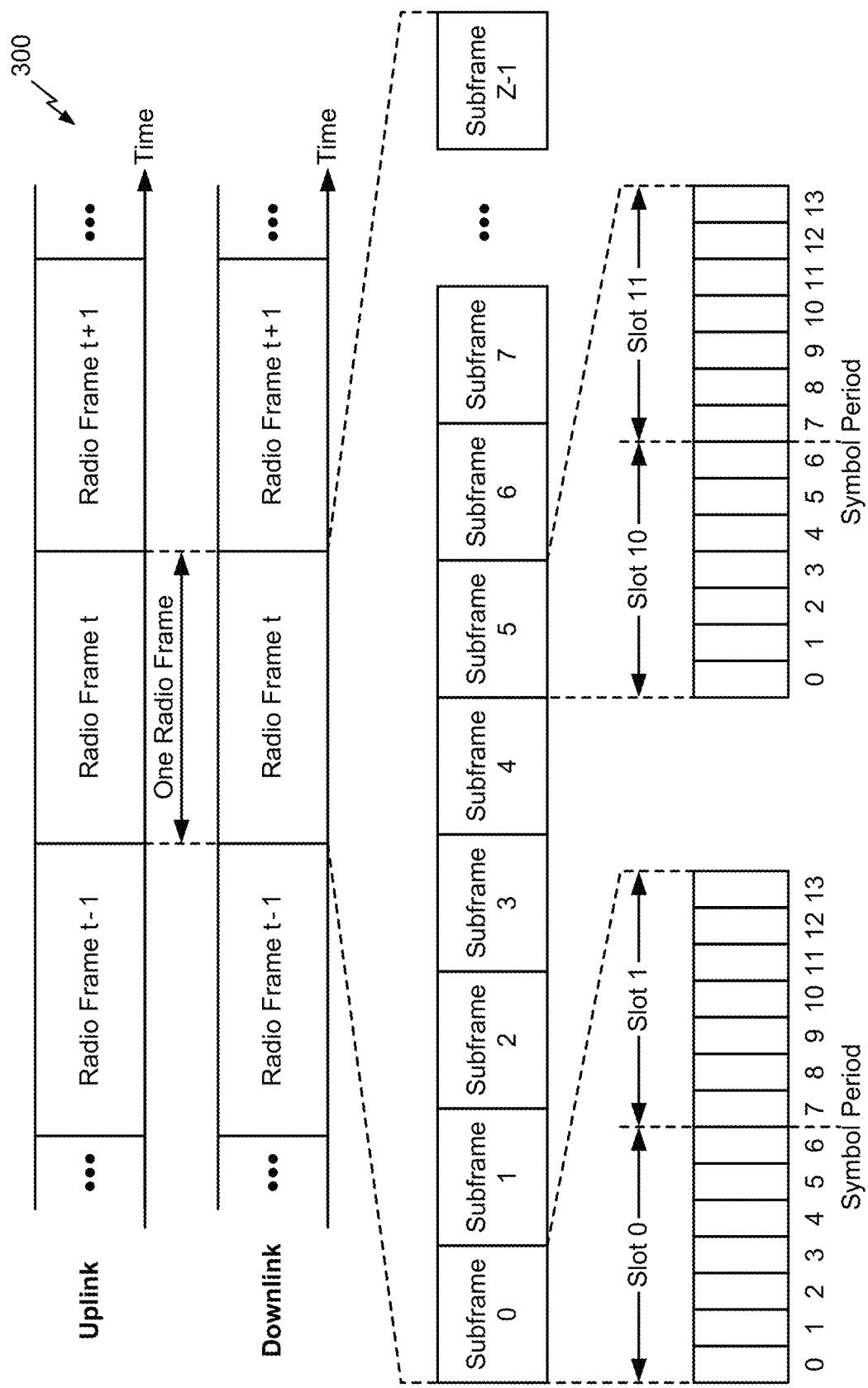
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
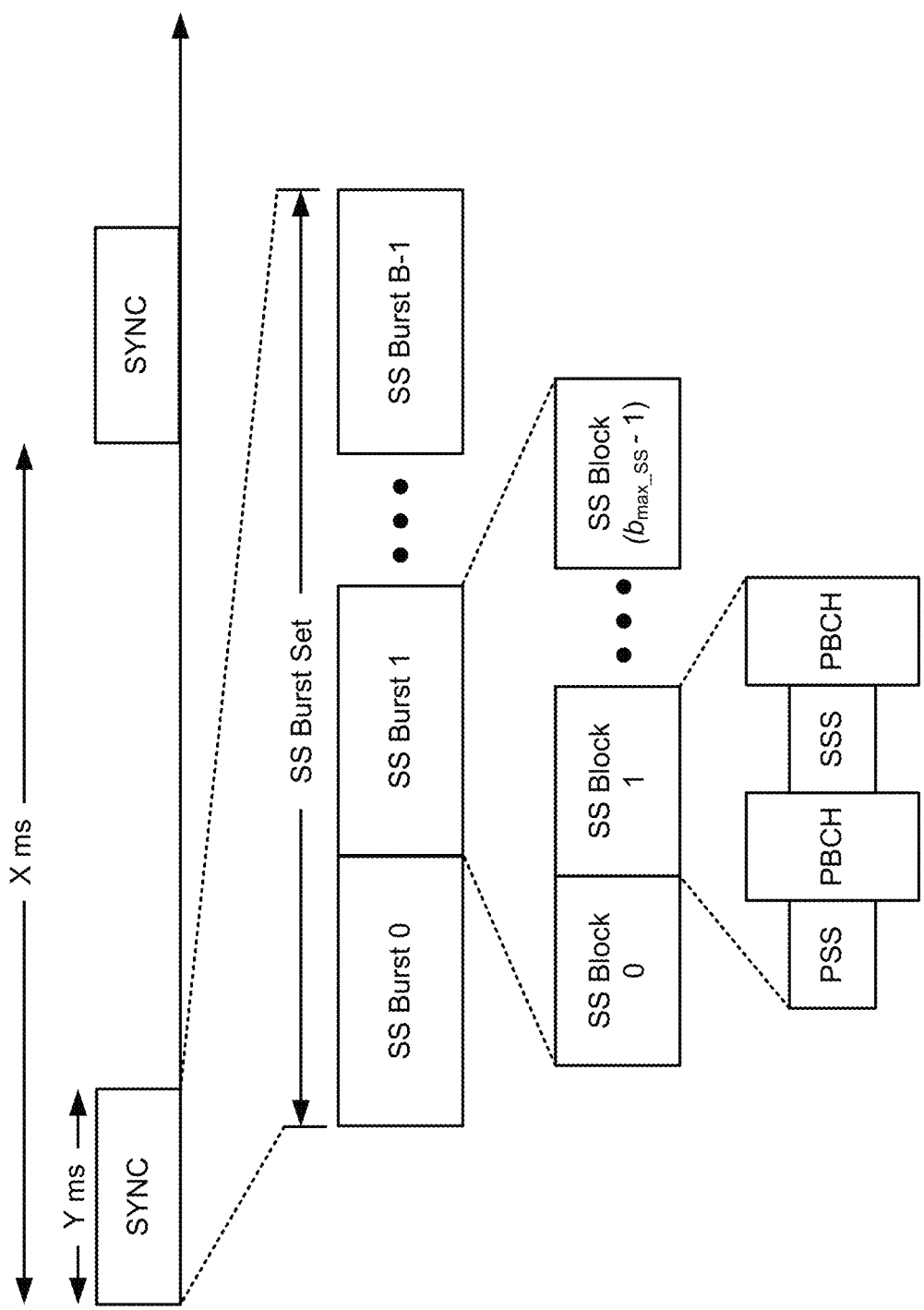
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
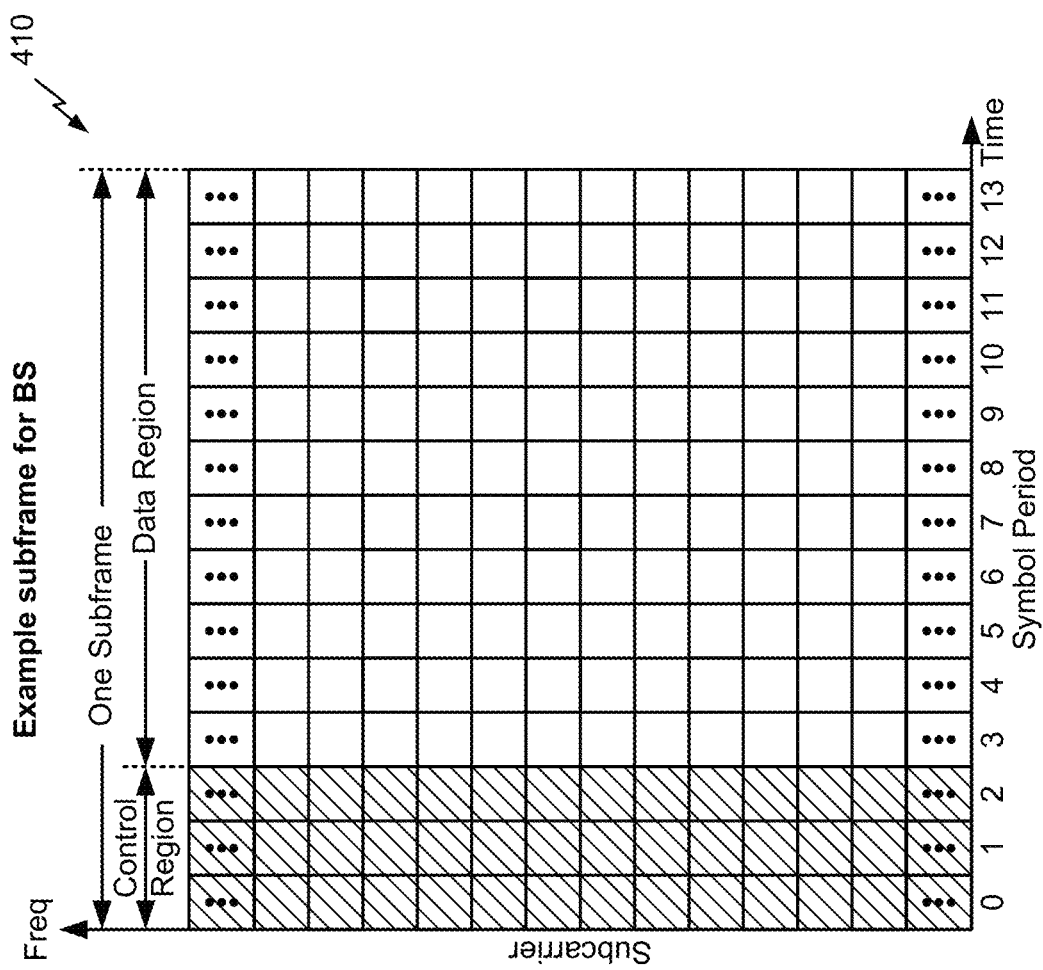
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
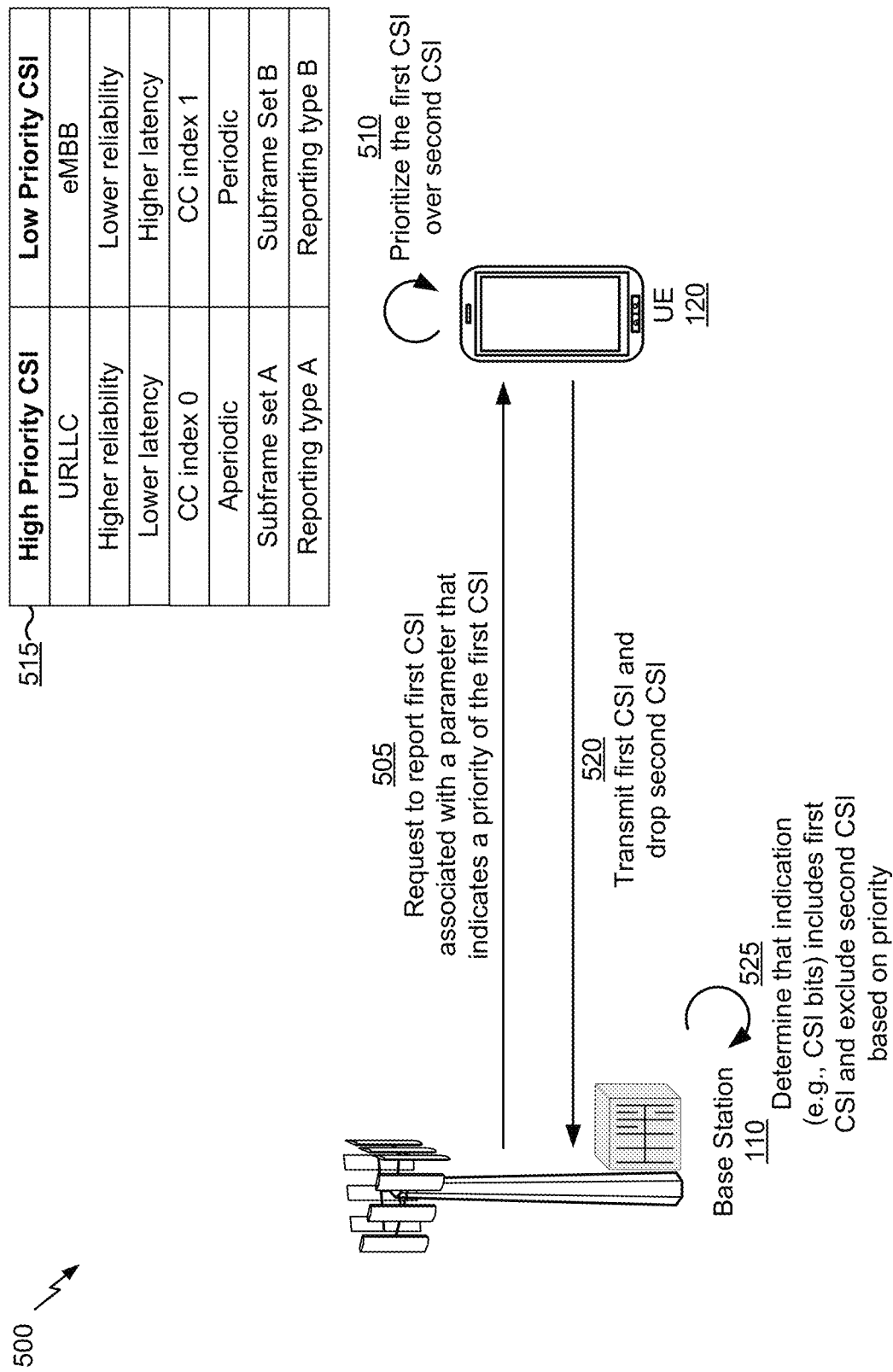
FIGS. 5-7 are diagrams illustrating examples of channel state information (CSI) operations for ultra-reliable low latency communications (URLLC), in accordance with various aspects of the present disclosure.

FIG. 5 is a diagram illustrating an example 500 of CSI operations for URLLC, in accordance with various aspects of the present disclosure.

As shown in FIG. 5, a base station 110 and a UE 120 may communicate with one another. In some aspects, the base station 110 and the UE 120 may communicate using a low latency requirement and/or a high reliability requirement, such as a URLLC requirement. In URLLC, for example, the base station 110 and the UE 120 may be required to communicate such that a 32-byte packet is communicated with a reliability of $10^{-5}$ with a 1 ms end-to-end latency. To satisfy such stringent reliability and/or latency requirements, the base station 110 should efficiently and effectively allocate resources for communications with various UEs 120.

To assist with appropriate resource allocation, the UE 120 may measure channel quality and/or other channel parameters of various channels (e.g., downlink channels) used to communicate with the base station 110, and may report such channel parameters as channel state information (CSI), such as a channel quality indicator (CQI), a rank indicator (RI), and/or the like. However, channel conditions may change over time, and a base station 110 that uses stale CSI to allocate resources may allocate those resources in a sub-optimal manner. Some techniques and apparatuses described herein use priority rules to prioritize CSI associated with URLLC, thereby providing the base station 110 with up-to-date (e.g., recently measured) CSI, which increases the likelihood that the base station 110 allocates resources effectively. Because there are limited uplink resources available for CSI, CSI associated with URLLC may be prioritized over other CSI so that stringent latency and/or reliability requirements of URLLC may be satisfied.

Furthermore, some techniques and apparatus described herein reduce an amount of overhead used to communicate CSI and/or to signal a resource allocation. In this way, the UE 120 and the base station 110 may improve usage of the limited uplink resources available for CSI and/or limited resources available for resource allocation signaling. This may permit transmission of more CSI within the limited uplink resources, and/or may permit signaling of dynamic resource allocations using a small amount of network resources. In this way, uplink and downlink performance may be improved, and network resources can be allocated more effectively.

As shown by reference number 505, the base station 110 may transmit, and the UE 120 may receive, a request to report first CSI. The first CSI may be associated with a parameter that indicates a priority of the first CSI. In some aspects, the parameter may be explicitly indicated. In some aspects, the parameter may be implicitly indicated (e.g., based at least in part on a channel, a resource, a component carrier, and/or the like via which the first CSI is transmitted or received). In some aspects, a single request may correspond to a single first CSI (e.g., the first CSI may be aperiodic). In some aspects, a single request may correspond to multiple first CSI (e.g., the first CSI may be periodic).

As shown by reference number 510, the UE 120 may prioritize the first CSI over a second CSI based at least in part on the parameter. For example, the first CSI may be associated with a first parameter that corresponds to a first priority level, and the second CSI may be associated with a second parameter that corresponds to a second priority level. In some aspects, the first priority level may be higher priority than the second priority level, indicating that the first CSI is higher priority than the second CSI. In some aspects, the UE 120 may compare parameters of multiple CSI to identify a priority order of the multiple CSI.

As shown by reference number 515, one or more parameters may be used to prioritize different CSI. In some aspects, a parameter may indicate a service type associated with a corresponding CSI. For example, the service type may include an enhanced mobile broadband (eMBB) service type, an ultra-reliable low latency communications (URLLC) service type, and/or the like. In some aspects, CSI associated with the URLLC service type may be prioritized over CSI associated with the eMBB service type. In this way, the base station 110 may use more accurate and/or more recent CSI when scheduling communications for URLLC, thereby increasing a likelihood that a latency requirement and/or a reliability requirement, associated with URLLC, is satisfied.

Additionally, or alternatively, a parameter may indicate a reliability requirement associated with a corresponding CSI. In some aspects, CSI associated with a higher reliability requirement may be prioritized over CSI associated with a lower reliability requirement. Additionally, or alternatively, a parameter may indicate a latency requirement associated with a corresponding CSI. In some aspects, CSI associated with a lower latency requirement may be prioritized over CSI associated with a higher latency requirement. In this way, the base station 110 may use more accurate and/or more recent CSI when scheduling communications associated with a higher reliability requirement and/or a lower latency requirement, thereby increasing a likelihood that such requirements are satisfied.

In some aspects, a latency requirement for CSI may be implicitly indicated. For example, a latency requirement for CSI may be indicated and/or determined based at least in part on a delay between a CSI request (e.g., transmitted by the base station 110 to the UE 120) and a resource scheduled for a CSI report corresponding to the CSI request. For example, the base station 110 may transmit, at a first time, a first CSI request for a first CSI report. At a second time, the base station 110 may transmit a second CSI request for a second CSI report. A first gap (e.g., a length of time) between the first CSI request and the first CSI report may be longer than a second gap between the second CSI request and the second CSI report. For example, the second CSI request may occur after the first CSI request, and/or the second CSI report may be scheduled to occur before the first CSI report. Based at least in part on determining that the second gap is shorter than the first gap, the UE 120 may determine that the second CSI report is associated with a lower latency requirement than the first CSI report. In this case, the UE 120 may prioritize the second CSI report over the first CSI report, in a similar manner as described elsewhere herein.

Additionally, or alternatively, a parameter may indicate a component carrier (CC) index associated with a corresponding CSI. In some aspects, CSI associated with a lower component carrier index may be prioritized over CSI associated with a higher component carrier index. Additionally, or alternatively, CSI associated with a primary cell (PCell) (e.g., having a CC index of 0) may be prioritized over CSI associated with a secondary cell (SCell) (e.g., having a CC index of 1). Additionally, or alternatively, CSI associated with a first SCell may be prioritized over CSI associated with a second SCell. In some aspects, a component carrier may be configured to carry control information for a group of component carriers, and CSI associated with that component carrier may be prioritized over CSI associated with other component carriers. In this way, the base station 110 may use more accurate and/or more recent CSI when scheduling communications on component carriers that carry more information and/or more important information than other component carriers.

Additionally, or alternatively, a parameter may indicate whether the first CSI is periodic CSI or aperiodic CSI. In some aspects, aperiodic CSI may be prioritized over periodic CSI. For example, the base station 110 may request aperiodic CSI due to an imminent transmission by the base station 110, whereas the base station 110 may request periodic CSI to obtain periodic updates on channel conditions. Thus, aperiodic CSI may be more urgent or more important than periodic CSI, and the base station 110 may use more accurate and/or more recent CSI when scheduling such urgent or important communications.

In some aspects, aperiodic CSI may be prioritized over periodic CSI when the aperiodic CSI and the periodic CSI are associated with the same service type (e.g., are both associated with an eMBB service type, are both associated with a URLLC service type, and/or the like). In some aspects, periodic CSI may be prioritized over aperiodic CSI when the periodic CSI is associated with a higher priority service type than the aperiodic CSI. For example, periodic CSI associated with a URLLC service type may be prioritized over aperiodic CSI associated with an eMBB service type.

Additionally, or alternatively, a parameter may indicate a subframe set (e.g., a set of subframes, slots, and/or the like) associated with a corresponding CSI. In some aspects, CSI associated with a first subframe set may be prioritized over CSI associated with a second subframe set. For example, different subframe sets may be used for CSI reporting under different assumptions of the interference level. Depending on the interference assumptions, the reliability target for each subframe set could be different. If the reporting for multiple subframe sets collide, then the subframe set with a higher reliability should take precedence. By prioritizing CSI for a subframe set associated with higher reliability, the base station 110 may use more accurate and/or more recent CSI when scheduling higher priority communications.

Additionally, or alternatively, a parameter may indicate a CSI reporting type associated with a corresponding CSI. The CSI reporting type may include, for example, a channel quality indicator (CQI), a precoding matrix indicator (PMI), a CSI reference signal resource indicator (CRI), a strongest layer indicator (SLI), a rank indication (RI), a reference signal received power (RSRP) parameter (e.g., a layer 1 (L1) RSRP), and/or the like. In some cases, different CSI reporting types may communicate different types of information about channel conditions, different amounts of information about channel conditions, and/or the like. In some aspects, a CSI reporting type that includes more information or more relevant information may be prioritized over a CSI reporting type that includes less information or less relevant information.

In some aspects, the UE 120 may use a single parameter described above to prioritize CSI. In some aspects, the UE 120 may use multiple parameters described above to prioritize CSI. Additionally, or alternatively, the UE 120 may analyze multiple parameters according to a sequence. In this case, if a parameter that occurs earlier in the sequence is the same for multiple CSI (e.g., a first CSI and a second CSI are both associated with a URLLC service type), then the UE 120 may analyze a parameter that occurs later in the sequence (e.g., a reliability requirement, a CC index, and/or the like). When analyzing multiple CSI, the UE 120 may analyze parameters according to the sequence until the UE 120 encounters a parameter that has a different value for different CSI, and may use the different values to prioritize the different CSI. An example sequence includes a service type, followed by a reliability requirement or a latency requirement, followed by a CC index, followed by whether the CSI is periodic or aperiodic. In some aspects, the UE 120 may store information regarding one or more parameters and/or the sequence in one or more tables.

As shown by reference number 520, the UE 120 may transmit the first CSI and may drop the second CSI based at least in part on prioritizing the first CSI over the second CSI. For example, the UE 120 may transmit, and the base station 110 may receive, an indication (e.g., a set of CSI bits) to indicate CSI for one or more channels, frequencies, beams, and/or the like. In some aspects, the UE 120 may be configured with a maximum number of bits capable of being used to indicate CSI (e.g., a maximum number of CSI bits). In this case, if a combined payload size of the first CSI and the second CSI is greater than the maximum number of bits, then the UE 120 may drop the lower priority second CSI and may transmit the higher priority first CSI using the set of CSI bits.

For example, the UE 120 may determine and/or be configured with a maximum supported payload size for an uplink resource (e.g., used to carry CSI, the set of CSI bits, and/or the like). Additionally, or alternatively, the UE 120 may determine and/or be configured with a maximum coding rate for transmission of CSI. In this case, if the maximum supported payload size at the maximum configured coding rate is less than a combined payload size of the first CSI and the second CSI, then the UE 120 may drop the second CSI, and may transmit the first CSI using the set of CSI bits.

Although some aspects are described herein in connection with first CSI and second CSI, in some aspects, more than two CSI may be requested, compared, prioritized, and/or transmitted. For example, the UE 120 may compare parameters for three CSI, and may determine that only one (or two) of the three CSI can be transmitted using the set of CSI bits. In this case, the UE 120 may determine a priority order for the three CSI, and may transmit the CSI with the highest priority (or the two CSI with the highest priorities) using the set of CSI bits. Similar processing and transmission may occur for four CSI, five CSI, and/or the like.

As shown by reference number 525, the base station 110 may determine that the set of CSI bits includes the first CSI and excludes the second CSI based at least in part on the first CSI being higher priority than the second CSI. For example, the base station 110 may store similar information as the UE 120 regarding prioritizing CSI (e.g., in one or more tables that indicate one or more parameters and/or a sequence of the one or more parameters). By using the same prioritization rules, the base station 110 may be able to determine which CSI will be included in a set of CSI bits received from the UE 120, and/or which CSI will be excluded from the set of CSI bits (e.g., because the base station 110 has information about the maximum supported payload size for reporting CSI, the maximum coding rate configured for the UE 120, and/or the like). In this way, the base station 110 can properly decode and/or interpret the CSI bits to determine a channel to which the received CSI corresponds, and may use the received CSI to allocate resources and/or schedule subsequent communications with the UE 120.

As indicated above, FIG. 5 is provided as an example. Other examples are possible and may differ from what was described with respect to FIG. 5.

Figure 6:
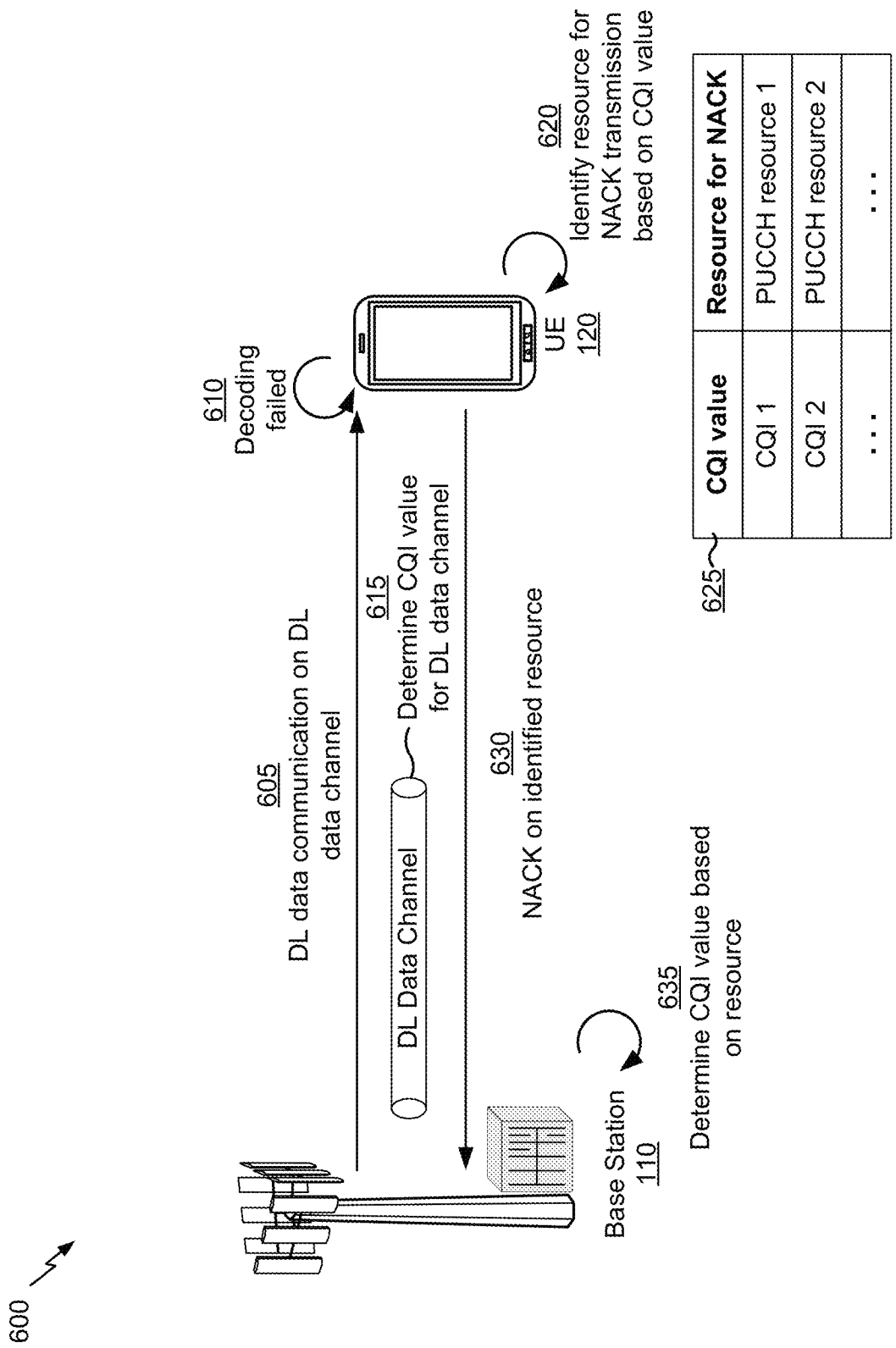

FIG. 6 is a diagram illustrating an example 600 of CSI operations for URLLC, in accordance with various aspects of the present disclosure.

As shown in FIG. 6, a base station 110 and a UE 120 may communicate with one another. In some aspects, the base station 110 and the UE 120 may communicate using a low latency requirement and/or a high reliability requirement, such as a URLLC requirement, as described above in connection with FIG. 5.

As shown by reference number 605, the base station 110 may transmit, and the UE 120 may receive, a downlink data communication on a downlink data channel. For example, the downlink data channel may be a PDSCH, and the downlink data communication may be a PDSCH communication.

As shown by reference number 610, the UE 120 may determine that the downlink data communication was not successfully decoded. For example, during decoding, the downlink data communication may fail a parity check, such as a cyclic redundancy check (CRC) and/or the like.

As shown by reference number 615, the UE 120 may determine a channel quality indicator (CQI) value for the downlink data channel. In some aspects, the UE 120 may determine the CQI value based at least in part on determining that the downlink data communication, received on the downlink data channel, was not successfully decoded. The CQI value may indicate a channel quality associated with the downlink data channel. In some aspects, the CQI value may suggest whether the re-transmission should occupy more resources (e.g., doubling the resources) than the initial transmission. In some aspects, the CQI value may have a coarse granularity, such as less than 32 possible CQI values, less than 16 possible CQI values, less than 8 possible CQI values, and/or the like, so that different CQI values can be differentiated using a limited set of different resources, as described below.

As shown by reference number 620, the UE 120 may identify a resource, for transmission of a negative acknowledgement (NACK), based at least in part on the CQI value. The NACK may correspond to the downlink data communication that was not successfully decoded. In some aspects, the resource may be a resource of an uplink control channel, such as a PUCCH and/or the like. For example, the resource may be a resource for transmission of ACK/NACK feedback. The resource may include, for example, a set of resource blocks to be used for transmission of the NACK, a number of resource blocks for transmission of the NACK, a cyclic shift to be used for transmission of the NACK, a demodulation reference signal (DMRS) to be used for transmission of the NACK, a set of data tones (e.g., even tones or odd tones) to be used for transmission of the NACK, an index of a physical resource block to be used for transmission of the NACK, an orthogonal cover code to be used for transmission of the NACK, a hopping pattern to be used for transmission of the NACK, and/or the like.

As shown by reference number 625, different resources for transmission of the NACK (e.g., different resources on the uplink control channel) may correspond to different CQI values. In some aspects, the UE 120 may select a resource from a plurality of resources that map to a corresponding plurality of CQI values. For example, the UE 120 may store a table that maps uplink control channel resources to CQI values. The UE 120 may use the table to perform a lookup to identify an uplink control channel resource that can be used to implicitly indicate the CQI value. In this way, the UE 120 may implicitly indicate the CQI value (e.g., without transmitting any bits that explicitly indicate the CQI value), thereby conserving network resources.

As shown by reference number 630, the UE 120 may transmit, and the base station 110 may receive, the NACK using the identified resource. Because the identified resource maps to a CQI value, by transmitting the NACK on the identified resource, the UE 120 may implicitly indicate the CQI value to the base station 110 without transmitting any bits dedicated to indicating the CQI value, thereby conserving network resources and overhead.

As shown by reference number 635, the base station 110 may determine the CQI value based at least in part on the resource via which the NACK is received. For example, the base station 110 may store information (e.g., in a table) that maps uplink control channel resources to corresponding CQI values. The base station 110 may determine a resource via which the NACK is received, may look up the resource in a table, and may identify a CQI value that corresponds to the resource.

In some aspects, the base station 110 may re-transmit the downlink data communication to the UE 120 based at least in part on the CQI value. For example, the base station 110 may identify a number of resource blocks to be used for the re-transmission, and/or the like, and may re-transmit the downlink data communication accordingly. By implicitly communicating the CQI value for a channel using a resource via which a NACK is transmitted, the UE 120 and the base station 110 may conserve network resources. Furthermore, the CQI value may be indicated at the same time as the NACK, which may lead to faster re-transmission using appropriate downlink resources.

As indicated above, FIG. 6 is provided as an example. Other examples are possible and may differ from what was described with respect to FIG. 6.

Figure 7:
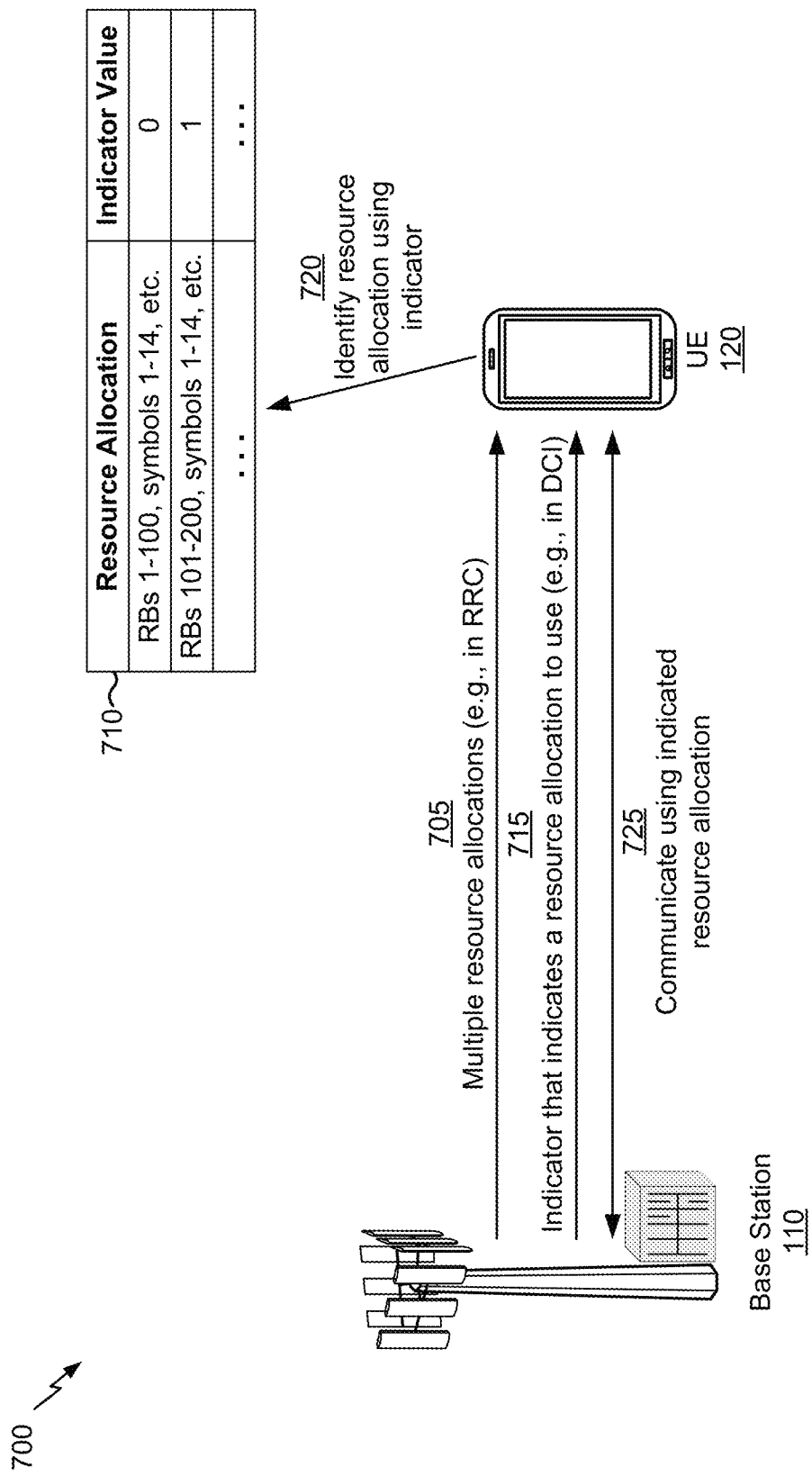

FIG. 7 is a diagram illustrating an example 700 of CSI operations for URLLC, in accordance with various aspects of the present disclosure.

As shown in FIG. 7, a base station 110 and a UE 120 may communicate with one another. In some aspects, the base station 110 and the UE 120 may communicate using a low latency requirement and/or a high reliability requirement, such as a URLLC requirement, as described above in connection with FIG. 5.

As shown by reference number 705, the base station 110 may transmit, and the UE 120 may receive, information that identifies multiple resource allocations. In some aspects, the information that identifies the multiple resource allocations may be included in a radio resource control (RRC) configuration message. In some aspects, the information may further identify multiple indicator values that correspond to the multiple resource allocations, such that the UE 120 can use an indicator value to identify a resource allocation from the multiple resource allocations, as described in more detail below. In some aspects, the indicator value may be implicitly indicated by an order in which the multiple resource allocations are identified.

As shown by reference number 710, the UE 120 may store the information that identifies the multiple resource allocations. In some aspects, the UE 120 may store multiple indicator values that correspond to the multiple resource allocations. For example, as shown, the UE 120 may store a table that maps resource allocations to indicator values. In some aspects, a resource allocation may indicate a set of frequency resources (e.g., a set of resource blocks and/or the like), a set of time resources (e.g., a set of symbols and/or the like), a set of spatial resources (e.g., a set of beams), and/or the like. For example, a single resource allocation may include a combination of a set of frequency domain resources, a set of time domain resources, and a set of spatial domain resources. In this case, different resource allocations may indicate different sets of frequency resources, different sets of time resources, different sets of spatial resources, and/or the like.

As shown by reference number 715, the base station 110 may transmit, and the UE 120 may receive, an indicator that indicates a resource allocation, of the multiple resource allocations, to be used by the UE 120. In some aspects, the indicator may be included in downlink control information (DCI). In this way, the base station 110 may dynamically indicate a resource allocation to be used for one or more communications granted in the DCI using fewer network resources than would be necessary to indicate the entire resource allocation in the DCI (e.g., without using an indicator).

As shown by reference number 720, the UE 120 may identify the resource allocation to be used based at least in part on the indicator. For example, the UE 120 may use the indicator value to perform a lookup, in a table that maps indicator values to corresponding resource allocations, to identify a resource allocation that maps to the indicator value.

In some aspects, different indicator values may map to different resource allocations. In some aspects, the same indicator value may map to different resource allocations depending on other information included in DCI that includes the indicator value. For example, a same indicator value may map to a first resource allocation for uplink communications (e.g., when the indicator value is indicated in connection with an uplink grant), and may map to a second resource allocation for downlink communications (e.g., when the indicator value is indicated in connection with a downlink grant). In this case, the UE may store two tables that map resource allocations to indicator values for the uplink communications and for the downlink communications, respectively. Additionally, or alternatively, a same indicator value may map to a first resource allocation for a first hybrid automatic repeat request (HARQ) redundancy version and/or a first modulation and coding scheme (MCS) (e.g., either or both of which may be indicated in DCI that includes the indicator value), and may map to a second resource allocation for a second HARQ redundancy version and/or a second MCS. In this case, the UE 120 may identify the resource allocation based at least in part on the indicator value, the HARQ redundancy version, the MCS, and/or the like. The UE may store multiple tables, where each table corresponds to a HARQ redundancy version and/or an MCS value, and where each table defines a mapping between the indicator values and the resource allocations (e.g., for different HARQ redundancy versions and/or MCS values). Similarly, different indicator values may map to the same resource allocation depending on other information included in DCI that includes the indicator value. In this way, fewer bits may be dedicated to the indicator value, thereby conserving network resources and overhead.

As shown by reference number 725, the base station 110 and the UE 120 may communicate with one another using the indicated resource allocation. For example, the base station 110 may transmit, and the UE 120 may receive, downlink information (e.g., downlink data and/or the like) using the indicated resource allocation. Additionally, or alternatively, the UE 120 may transmit, and the base station 110 may receive, uplink information (e.g., uplink data and/or the like) using the indicated resource allocation.

By indicating multiple resource allocations and selecting one of the indicated resource allocations for communication, the base station 110 and the UE 120 may conserve network resources used to dynamically indicate a resource allocation. Furthermore, the base station 110 and UE 120 may signal resource allocations with fine granularity (e.g., out of large number of possible resource allocations) using a small amount of network resources. Furthermore, the base station 110 and the UE 120 may dynamically adapt to changing network conditions, which may be indicated using CSI and/or CQI, as described elsewhere herein. For example, the base station 110 may receive CSI and/or CQI from the UE 120, and may dynamically signal a resource allocation based at least in part on the received CSI and/or CQI, thereby improving network performance and increasing a likelihood that a latency requirement and/or a reliability requirement is satisfied. In some aspects, the CSI and/or CQI may be asynchronous and/or used for a re-transmission, and the resource allocation used for the re-transmission may be different than the resource allocation used for the initial transmission. In this way, the UE 120 and the base station 110 may quickly adapt to changing network conditions.

As indicated above, FIG. 7 is provided as an example. Other examples are possible and may differ from what was described with respect to FIG. 7.

Figure 8:
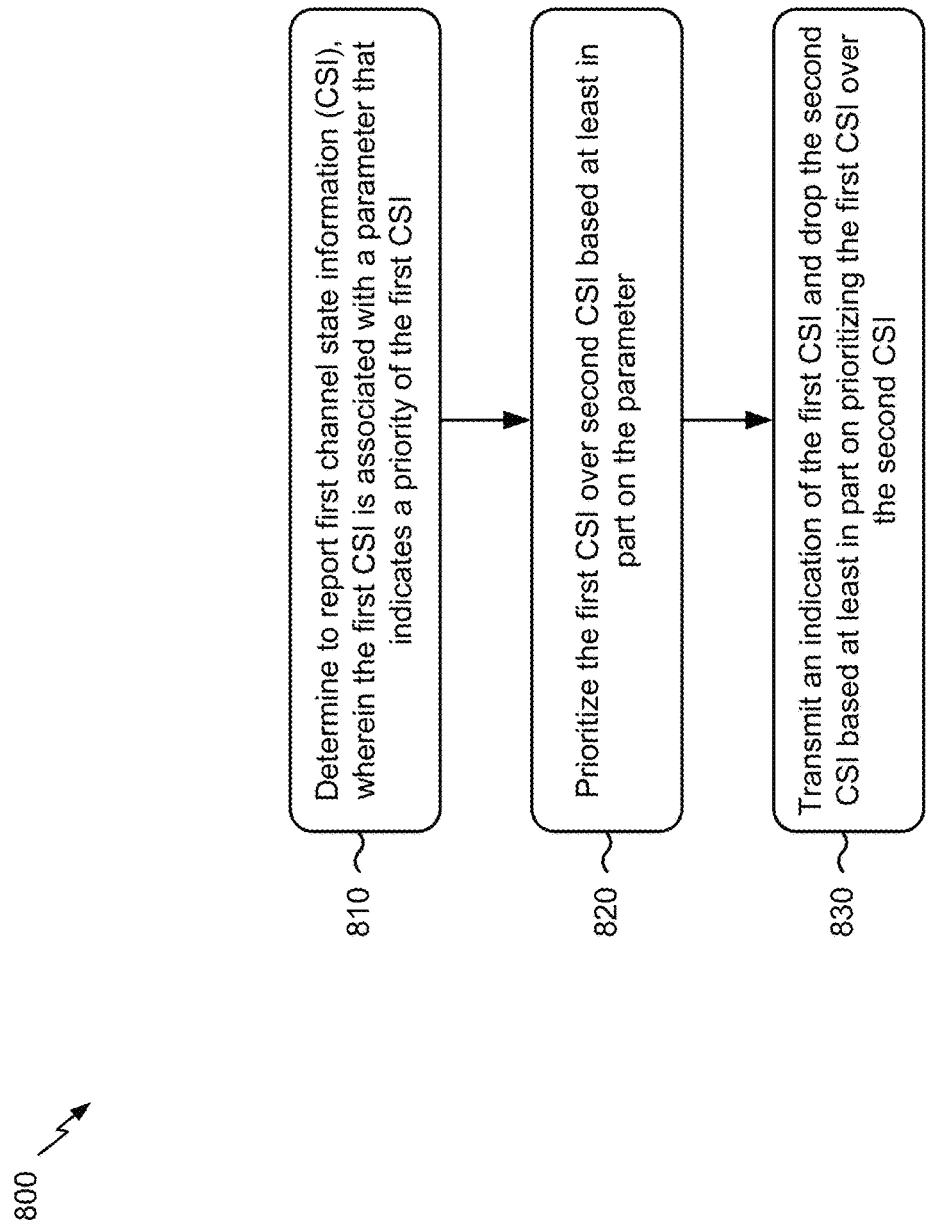

FIG. 8 is a diagram illustrating an example process 800 performed, for example, by a UE, in accordance with various aspects of the present disclosure. Example process 800 is an example where a UE (e.g., UE 120 and/or the like) performs CSI operations for URLLC.

As shown in FIG. 8, in some aspects, process 800 may include determining to report first channel state information (CSI), wherein the first CSI is associated with a parameter that indicates a priority of the first CSI (block 810). For example, the UE (e.g., using antenna 252, DEMOD 254, MIMO detector 256, receive processor 258, controller/processor 280, and/or the like) may determine to report first channel state information (CSI), as described above in connection with FIG. 5. In some aspects, the first CSI may be associated with a parameter that indicates a priority of the first CSI. In some aspects, the UE may determine to report first CSI based at least in part on receiving a request to report first CSI.

As further shown in FIG. 8, in some aspects, process 800 may include prioritizing the first CSI over second CSI based at least in part on the parameter (block 820). For example, the UE (e.g., using controller/processor 280 and/or the like) may prioritize the first CSI over second CSI based at least in part on the parameter, as described above in connection with FIG. 5.

As further shown in FIG. 8, in some aspects, process 800 may include transmitting an indication of the first CSI and dropping the second CSI based at least in part on prioritizing the first CSI over the second CSI (block 830). For example, the UE (e.g., using controller/processor 280, transmit processor 264, TX MIMO processor 266, MOD 254, antenna 252, and/or the like) may transmit an indication of the first CSI and may drop the second CSI based at least in part on prioritizing the first CSI over the second CSI, as described above in connection with FIG. 5.

Process 800 may include additional aspects, such as any single aspect or any combination of aspects described below and/or in connection with one or more other processes described herein.

In some aspects, the parameter indicates at least one of: a service type associated with the first CSI, a reliability requirement associated with the first CSI, a latency requirement associated with the first CSI, a component carrier index associated with the first CSI, whether the first CSI is periodic CSI or aperiodic CSI, a subframe set associated with the first CSI, a CSI reporting type associated with the first CSI, or some combination thereof. In some aspects, the service type includes an enhanced mobile broadband (eMBB) service type or an ultra-reliable low latency communications (URLLC) service type. In some aspects, the CSI reporting type includes at least one of a channel quality indicator (CQI), a precoding matrix indicator (PMI), a CSI reference signal (CSI-RS) resource indicator (CRI), a strongest layer indicator (SLI), a rank indication (RI), a reference signal received power (RSRP) parameter, or some combination thereof.

In some aspects, the indication of the first CSI is transmitted and the second CSI is dropped based at least in part on a determination that a maximum supported payload size on an uplink resource at a maximum configured coding rate for transmission of CSI is less than a combined payload size of the first CSI and the second CSI.

In some aspects, the first CSI is associated with an ultra-reliable low latency communications (URLLC) service type and the second CSI is associated with an enhanced mobile broadband (eMBB) service type. In some aspects, the first CSI is associated with a higher reliability requirement or a lower latency requirement than the second CSI. In some aspects, the first CSI is associated with a lower component carrier index than the second CSI. In some aspects, the first CSI is aperiodic CSI and the second CSI is periodic CSI, and the first CSI and the second CSI are associated with a same service type. In some aspects, the first CSI is periodic CSI and the second CSI is aperiodic CSI, and the first CSI is associated with an ultra-reliable low latency communications (URLLC) service type and the second CSI is associated with an enhanced mobile broadband (eMBB) service type. In some aspects, the first CSI is prioritized over the second CSI based at least in part on multiple parameters, associated with the first CSI and the second CSI, analyzed according to a sequence.

In some aspects, the determination to report the first CSI is based at least in part on a determination that a downlink data communication, received on a downlink data channel, was not successfully decoded. In some aspects, transmitting the indication of the first CSI comprises transmitting a negative acknowledgement (NACK), corresponding to the downlink data communication, using a resource that implicitly indicates the first CSI. In some aspects, the first CSI includes a channel quality indicator (CQI) value for the downlink data channel. In some aspects, the resource is identified based at least in part on the CQI value. In some aspects, the resource is identified based at least in part on selecting the resource from a plurality of uplink control channel resources that map to a corresponding plurality of CQI values. In some aspects, the resource includes at least one of: a number of resource blocks for transmission of the NACK, a cyclic shift to be used for transmission of the NACK, a demodulation reference signal (DMRS) to be used for transmission of the NACK, a set of data tones to be used for transmission of the NACK, an index of a physical resource block to be used for transmission of the NACK, an orthogonal cover code to be used for transmission of the NACK, a hopping pattern to be used for transmission of the NACK, or a combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
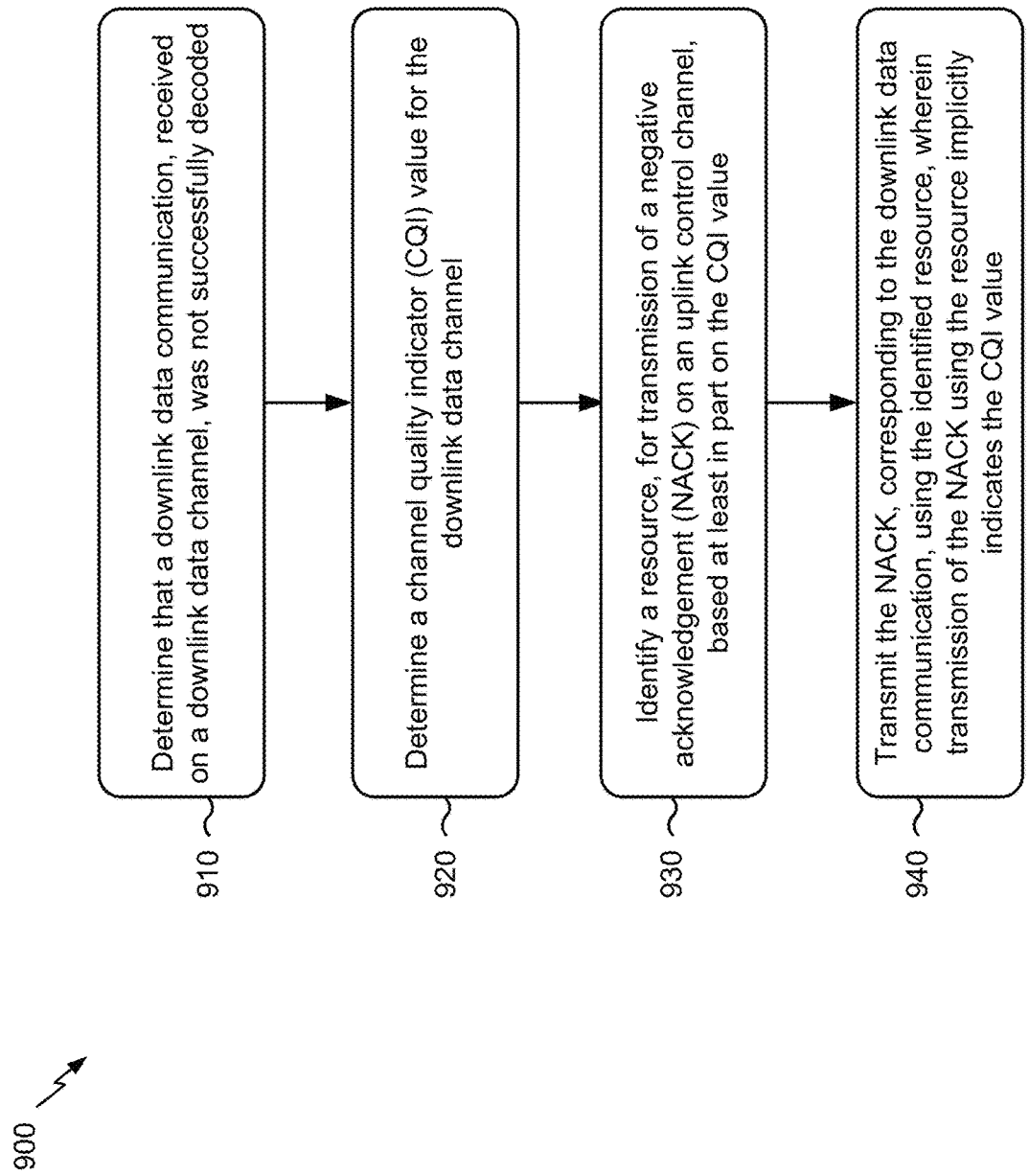

FIG. 9 is a diagram illustrating an example process 900 performed, for example, by a UE, in accordance with various aspects of the present disclosure. Example process 900 is an example where a UE (e.g., UE 120 and/or the like) performs CSI operations for URLLC.

As shown in FIG. 9, in some aspects, process 900 may include determining that a downlink data communication, received on a downlink data channel, was not successfully decoded (block 910). For example, the UE (e.g., using controller/processor 280 and/or the like) may determine that a downlink data communication, received on a downlink data channel, was not successfully decoded, as described above in connection with FIG. 6.

As further shown in FIG. 9, in some aspects, process 900 may include determining a channel quality indicator (CQI) value for the downlink data channel (block 920). For example, the UE (e.g., using controller/processor 280 and/or the like) may determine a channel quality indicator (CQI) value for the downlink data channel, as described above in connection with FIG. 6.

As further shown in FIG. 9, in some aspects, process 900 may include identifying a resource, for transmission of a negative acknowledgement (NACK) on an uplink control channel, based at least in part on the CQI value (block 930). For example, the UE (e.g., using controller/processor 280 and/or the like) may identify a resource, for transmission of a negative acknowledgement (NACK) on an uplink control channel, based at least in part on the CQI value, as described above in connection with FIG. 6.

As further shown in FIG. 9, in some aspects, process 900 may include transmitting the NACK, corresponding to the downlink data communication, using the identified resource, wherein transmission of the NACK using the resource implicitly indicates the CQI value (block 940). For example, the UE (e.g., using controller/processor 280, transmit processor 264, TX MIMO processor 266, MOD 254, antenna 252, and/or the like) may transmit the NACK, corresponding to the downlink data communication, using the identified resource, as described above in connection with FIG. 6. In some aspects, transmission of the NACK using the resource implicitly indicates the CQI value.

Process 900 may include additional aspects, such as any single aspect or any combination of aspects described below and/or in connection with one or more other processes described herein.

In some aspects, identifying the resource comprises selecting the resource from a plurality of uplink control channel resources that map to a corresponding plurality of CQI values. In some aspects, the resource includes at least one of: a number of resource blocks for transmission of the NACK, a cyclic shift to be used for transmission of the NACK, a demodulation reference signal (DMRS) to be used for transmission of the NACK, a set of data tones to be used for transmission of the NACK, an index of a physical resource block to be used for transmission of the NACK, an orthogonal cover code to be used for transmission of the NACK, a hopping pattern to be used for transmission of the NACK, or some combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
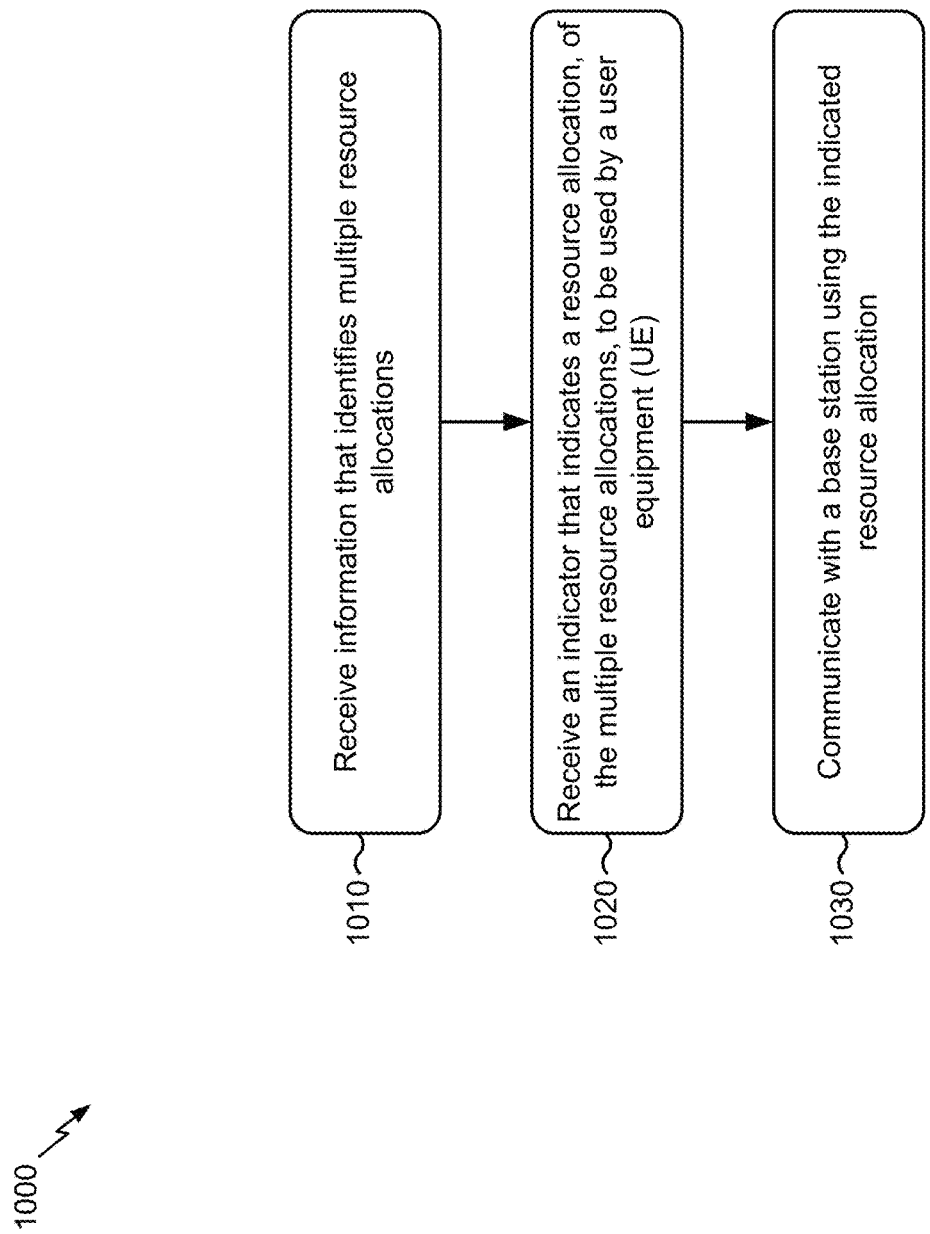

FIG. 10 is a diagram illustrating an example process 1000 performed, for example, by a UE, in accordance with various aspects of the present disclosure. Example process 1000 is an example where a UE (e.g., UE 120 and/or the like) performs CSI operations for URLLC.

As shown in FIG. 10, in some aspects, process 1000 may include receiving information that identifies multiple resource allocations (block 1010). For example, the UE (e.g., using antenna 252, DEMOD 254, MIMO detector 256, receive processor 258, controller/processor 280, and/or the like) may receive information that identifies multiple resource allocations, as described above in connection with FIG. 7.

As further shown in FIG. 10, in some aspects, process 1000 may include receiving an indicator that indicates a resource allocation, of the multiple resource allocations, to be used by a UE (block 1020). For example, the UE (e.g., using antenna 252, DEMOD 254, MIMO detector 256, receive processor 258, controller/processor 280, and/or the like) may receive an indicator that indicates a resource allocation, of the multiple resource allocations, to be used by the UE, as described above in connection with FIG. 7.

As further shown in FIG. 10, in some aspects, process 1000 may include communicating with a base station using the indicated resource allocation (block 1030). For example, the UE (e.g., using antenna 252, DEMOD 254, MIMO detector 256, receive processor 258, controller/processor 280, transmit processor 264, TX MIMO processor 266, MOD 254, and/or the like) may communicate with a base station using the indicated resource allocation, as described above in connection with FIG. 7.

Process 1000 may include additional aspects, such as any single aspect or any combination of aspects described below and/or in connection with one or more other processes described herein.

In some aspects, the information that identifies the multiple resource allocations is received in a radio resource control (RRC) configuration message. In some aspects, the indicator is received in downlink control information (DCI). In some aspects, the resource allocation indicates one or more time resources, one or more frequency resources, one or more spatial resources, or some combination thereof.

In some aspects, the resource allocation is identified based at least in part on a hybrid automatic repeat request (HARQ)

redundancy version or a modulation and coding scheme (MCS) associated with one or more communications transmitted to or received from the base station. In some aspects, the HARQ redundancy version or the MCS is indicated in downlink control information (DCI).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
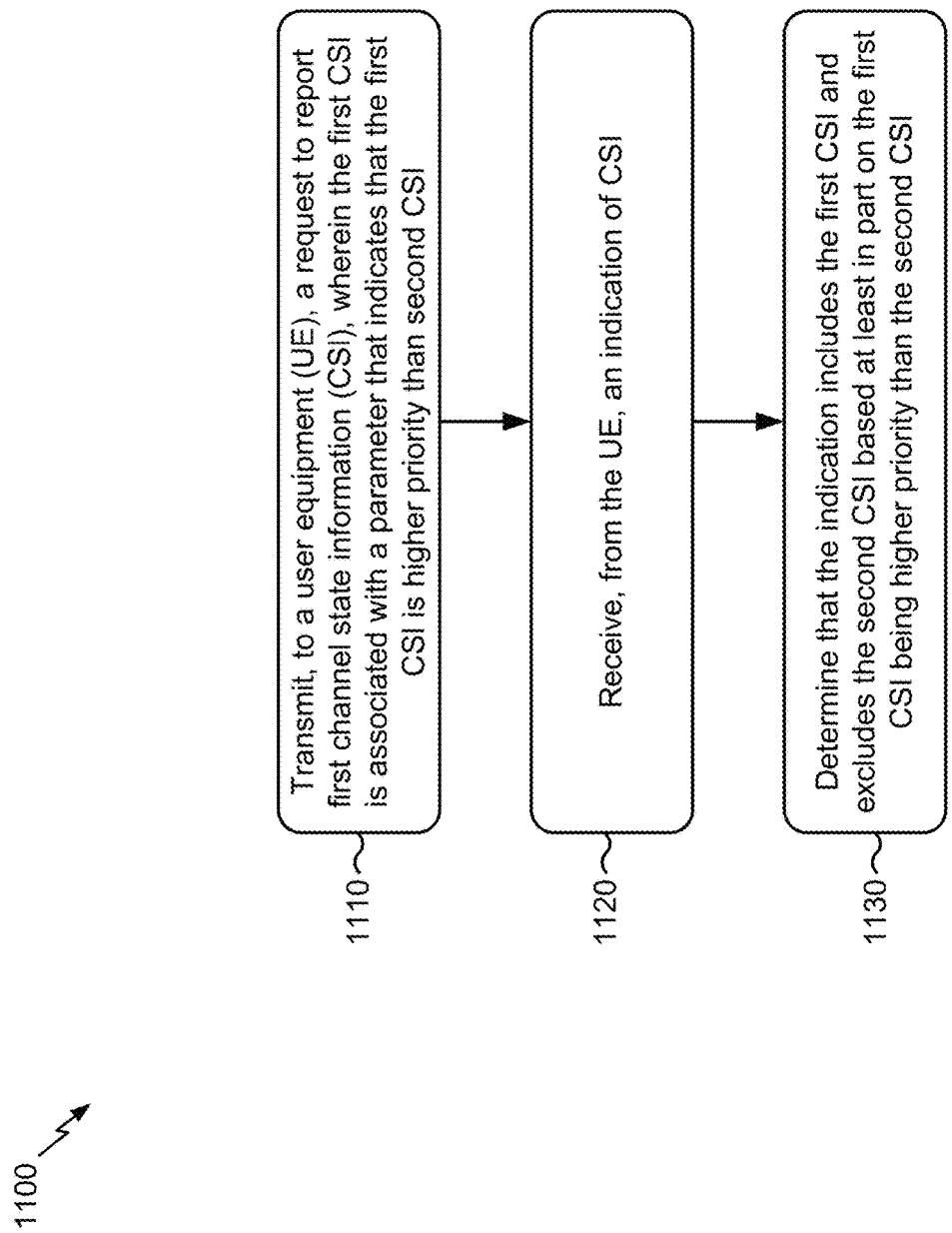

FIG. 11 is a diagram illustrating an example process 1100 performed, for example, by a base station, in accordance with various aspects of the present disclosure. Example process 1100 is an example where a base station (e.g., base station 110 and/or the like) performs CSI operations for URLLC.

As shown in FIG. 11, in some aspects, process 1100 may include transmitting, to a user equipment (UE), a request to report first channel state information (CSI), wherein the first CSI is associated with a parameter that indicates that the first CSI is higher priority than second CSI (block 1110). For example, the base station (e.g., using controller/processor 240, transmit processor 220, TX MIMO processor 230, MOD 232, antenna 234, and/or the like) may transmit, to a user equipment (UE), a request to report first channel state information (CSI), as described above in connection with FIG. 5. In some aspects, the first CSI is associated with a parameter that indicates that the first CSI is higher priority than second CSI.

As further shown in FIG. 11, in some aspects, process 1100 may include receiving, from the UE, an indication of CSI (block 1120). For example, the base station (e.g., using antenna 234, DEMOD 232, MIMO detector 236, receive processor 238, controller/processor 240, and/or the like) may receive, from the UE, an indication of CSI, as described above in connection with FIG. 5. In some aspects, the indication may include a set of CSI bits that indicate the CSI.

As further shown in FIG. 11, in some aspects, process 1100 may include determining that indication includes the first CSI and excludes the second CSI based at least in part on the first CSI being higher priority than the second CSI (block 1130). For example, the base station (e.g., using controller/processor 240 and/or the like) may determine that the indication includes the first CSI and excludes the second CSI based at least in part on the first CSI being higher priority than the second CSI, as described above in connection with FIG. 5.

Process 1100 may include additional aspects, such as any single aspect or any combination of aspects described below and/or in connection with one or more other processes described herein.

In some aspects, the parameter indicates at least one of: a service type associated with the first CSI, a reliability requirement associated with the first CSI, a latency requirement associated with the first CSI, a component carrier index associated with the first CSI, whether the first CSI is periodic CSI or aperiodic CSI, a subframe set associated with the first CSI, a CSI reporting type associated with the first CSI, or some combination thereof. In some aspects, the service type includes an enhanced mobile broadband (eMBB) service type or an ultra-reliable low latency communications (URLLC) service type. In some aspects, the CSI reporting type includes at least one of a channel quality indicator (CQI), a precoding matrix indicator (PMI), a CSI reference signal (CSI-RS) resource indicator (CRI), a strongest layer indicator (SLI), a rank indication (RI), a reference signal received power (RSRP) parameter, or some combination thereof.

In some aspects, the base station may determine that the first CSI is included and the second CSI is excluded based at least in part on a determination that a maximum supported payload size on an uplink resource at a maximum configured coding rate for transmission of CSI is less than a combined payload size of the first CSI and the second CSI.

In some aspects, the first CSI is associated with an ultra-reliable low latency communications (URLLC) service type and the second CSI is associated with an enhanced mobile broadband (eMBB) service type. In some aspects, the first CSI is associated with a higher reliability requirement or a lower latency requirement than the second CSI. In some aspects, the first CSI is associated with a lower component carrier index than the second CSI. In some aspects, the first CSI is aperiodic CSI and the second CSI is periodic CSI, and the first CSI and the second CSI are associated with a same service type. In some aspects, the first CSI is periodic CSI and the second CSI is aperiodic CSI, and the first CSI is associated with an ultra-reliable low latency communications (URLLC) service type and the second CSI is associated with an enhanced mobile broadband (eMBB) service type. In some aspects, the base station 110 may determine that the first CSI is higher priority than the second CSI based at least in part on multiple parameters, associated with the first CSI and the second CSI, analyzed according to a sequence.

In some aspects, the indication of the CSI includes a negative acknowledgement (NACK) corresponding to a downlink data communication transmitted to the UE, wherein the NACK is received using a resource that implicitly indicates the CSI. In some aspects, the CSI includes a channel quality indicator (CQI) value for the downlink data channel, and wherein the CQI value is identified based at least in part on the resource. In some aspects, the resource includes at least one of: a number of resource blocks used for the NACK, a cyclic shift used for the NACK, a demodulation reference signal (DMRS) used for the NACK, a set of data tones used for the NACK, an index of a physical resource block used for the NACK, an orthogonal cover code used for the NACK, a hopping pattern used for the NACK, or a combination thereof. In some aspects, process 1100 includes re-transmitting the downlink data communication based at least in part on the CSI.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a base station, in accordance with various aspects of the present disclosure. Example process 1200 is an example where a base station (e.g., base station 110 and/or the like) performs CSI operations for URLLC.

As shown in FIG. 12, in some aspects, process 1200 may include transmitting a downlink data communication on a downlink data channel (block 1210). For example, the base station (e.g., using controller/processor 240, transmit processor 220, TX MIMO processor 230, MOD 232, antenna 234, and/or the like) may transmit a downlink data communication on a downlink data channel, as described above in connection with FIG. 6.

As further shown in FIG. 12, in some aspects, process 1200 may include receiving a negative acknowledgement (NACK), corresponding to the downlink data communication, on a resource of an uplink control channel, wherein the resource maps to a channel quality indicator (CQI) value for the downlink data channel (block 1220). For example, the base station (e.g., using antenna 234, DEMOD 232, MIMO detector 236, receive processor 238, controller/processor 240, and/or the like) may receive a NACK, corresponding to the downlink data communication, on a resource of an uplink control channel, wherein the resource maps to a CQI value for the downlink data channel, as described above in connection with FIG. 6.

As further shown in FIG. 12, in some aspects, process 1200 may include determining the CQI value based at least in part on the resource via which the NACK is received (block 1230). For example, the base station (e.g., using controller/processor 240 and/or the like) may determine the CQI value based at least in part on the resource via which the NACK is received, as described above in connection with FIG. 6.

Process 1200 may include additional aspects, such as any single aspect or any combination of aspects described below and/or in connection with one or more other processes described herein.

In some aspects, the base station may re-transmit the downlink data communication based at least in part on the determined CQI value. In some aspects, determining the CQI values comprises identifying the CQI value from a plurality of CQI values that map to a corresponding plurality of uplink control resources. In some aspects, the resource includes at least one of: a number of resource blocks via which the NACK is received, a cyclic shift via which the NACK is received, a demodulation reference signal (DMRS) via which the NACK is received, a set of data tones via which the NACK is received, an index of a physical resource block via which the NACK is received, an orthogonal cover code via which the NACK is received, a hopping pattern via which the NACK is received, or some combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a base station, in accordance with various aspects of the present disclosure. Example process 1300 is an example where a base station (e.g., base station 110 and/or the like) performs CSI operations for URLLC.

As shown in FIG. 13, in some aspects, process 1300 may include transmitting, to a user equipment (UE), information that identifies multiple resource allocations (block 1310). For example, the base station (e.g., using controller/processor 240, transmit processor 220, TX MIMO processor 230, MOD 232, antenna 234, and/or the like) may transmit, to a user equipment (UE), information that identifies multiple resource allocations, as described above in connection with FIG. 7.

As further shown in FIG. 13, in some aspects, process 1300 may include transmitting, to the UE, an indicator that indicates a resource allocation, of the multiple resource allocations, to be used by the UE (block 1320). For example, the base station (e.g., using controller/processor 240, transmit processor 220, TX MIMO processor 230, MOD 232, antenna 234, and/or the like) may transmit, to the UE, an indicator that indicates a resource allocation, of the multiple resource allocations, to be used by the UE, as described above in connection with FIG. 7.

As further shown in FIG. 13, in some aspects, process 1300 may include communicating with the UE using the indicated resource allocation (block 1330). For example, the base station (e.g., using DEMOD 232, MIMO detector 236, receive processor 238, controller/processor 240, transmit processor 220, TX MIMO processor 230, MOD 232, antenna 234, and/or the like) may communicate with the UE using the indicated resource allocation, as described above in connection with FIG. 7.

Process 1300 may include additional aspects, such as any single aspect or any combination of aspects described below and/or in connection with one or more other processes described herein.

In some aspects, the information that identifies the multiple resource allocations is transmitted in a radio resource control (RRC) configuration message. In some aspects, the indicator is transmitted in downlink control information (DCI). In some aspects, the resource allocation indicates one or more time resources, one or more frequency resources, one or more spatial resources, or some combination thereof. In some aspects, a HARQ redundancy version or an MCS is indicated in downlink control information (DCI) to indicate the resource allocation.

In some aspects, the base station may transmit, to the UE, at least one of a hybrid automatic repeat request (HARM) redundancy version or a modulation and coding scheme (MCS) value that, with the indicator, indicates the resource allocation.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining to report first channel state information (CSI), wherein the first CSI is associated with one or more first parameters that correspond to a first priority level and indicate a first service type and two or more of:
        a reliability requirement associated with the first CSI,
        a latency requirement associated with the first CSI,
        a component carrier index associated with the first CSI,
        whether the first CSI is periodic CSI or aperiodic CSI,
        a subframe set associated with the first CSI, or
        a CSI reporting type associated with the first CSI;
    prioritizing the first CSI over second CSI, associated with one or more second parameters that correspond to a second priority level and indicate a second service type, based at least in part on the one or more first parameters and the one or more second parameters, wherein the second service type is different from the first service type; and
    transmitting an indication of the first CSI and dropping the second CSI based at least in part on prioritizing the first CSI over the second CSI.

2. The method of claim 1, wherein the second service type includes an enhanced mobile broadband (eMBB) service type, and wherein the first service type includes an ultra-reliable low latency communications (URLLC) service type.

3. The method of claim 1, wherein the CSI reporting type includes at least one of a channel quality indicator (CQI), a precoding matrix indicator (PMI), a CSI reference signal (CSI-RS) resource indicator (CRI), a strongest layer indicator (SLI), a rank indication (RI), a reference signal received power (RSRP) parameter, or some combination thereof.

4. The method of claim 1, wherein the indication of the first CSI is transmitted and the second CSI is dropped based at least in part on a determination that a maximum supported payload size on an uplink resource at a maximum configured coding rate for transmission of CSI is less than a combined payload size of the first CSI and the second CSI.

5. The method of claim 1, wherein:
    the first services type is an ultra-reliable low latency communications (URLLC) service type,
    the second service type is an enhanced mobile broadband (eMBB) service type,
    the first CSI is associated with a higher reliability requirement or a lower latency requirement than the second CSI,
    the first CSI is associated with a lower component carrier index than the second CSI, or
    a combination thereof.

6. The method of claim 1, wherein the first CSI is aperiodic CSI and the second CSI is periodic CSI.

7. The method of claim 1, wherein the first CSI is periodic CSI and the second CSI is aperiodic CSI, and wherein the first service type is an ultra-reliable low latency communications (URLLC) service type and the second service type is an enhanced mobile broadband (eMBB) service type.

8. The method of claim 1, wherein the first CSI is prioritized over the second CSI based at least in part on multiple parameters, associated with the first CSI and the second CSI, analyzed according to a sequence.

9. The method of claim 1, wherein the determination to report the first CSI is based at least in part on a determination that a downlink data communication, received on a downlink data channel, was not successfully decoded; and
    wherein transmitting the indication of the first CSI comprises transmitting a negative acknowledgement (NACK), corresponding to the downlink data communication, using a resource that implicitly indicates the first CSI.

10. The method of claim 9, wherein the first CSI includes a channel quality indicator (CQI) value for the downlink data channel.

11. The method of claim 10, wherein the resource is identified based at least in part on the CQI value.

12. The method of claim 9, wherein the resource includes at least one of:
    a number of resource blocks for transmission of the NACK,
    a cyclic shift to be used for transmission of the NACK,
    a demodulation reference signal (DMRS) to be used for transmission of the NACK,
    a set of data tones to be used for transmission of the NACK,
    an index of a physical resource block to be used for transmission of the NACK,
    an orthogonal cover code to be used for transmission of the NACK,
    a hopping pattern to be used for transmission of the NACK, or
    a combination thereof.

13. The method of claim 10, wherein the resource is identified based at least in part on selecting the resource from a plurality of uplink control channel resources that map to a corresponding plurality of CQI values.

14. A method of wireless communication performed by a base station, comprising:
    transmitting, to a user equipment (UE), a request to report first channel state information (CSI), wherein the first CSI is associated with one or more first parameters that correspond to a first priority level and indicate a first service type and two or more of:
        a reliability requirement associated with the first CSI, a latency requirement associated with the first CSI,
a component carrier index associated with the first CSI,
whether the first CSI is periodic CSI or aperiodic CSI,
a subframe set associated with the first CSI, or
a CSI reporting type associated with the first CSI;
receiving, from the UE, an indication of CSI; and
determining that the indication includes the first CSI and excludes a second CSI, associated with one or more second parameters that correspond to a second priority level and indicate a second service type, based at least in part on the first priority level being higher than the second priority level, wherein the second service type is different from the first service type.

15. The method of claim 14, wherein:
the first services type is an ultra-reliable low latency communications (URLLC) service type,
the second service type is an enhanced mobile broadband (eMBB) service type,
the first CSI is associated with a higher reliability requirement or a lower latency requirement than the second CSI,
the first CSI is associated with a lower component carrier index than the second CSI, or
a combination thereof.

16. The method of claim 14, wherein the indication of the CSI includes a negative acknowledgement (NACK) corresponding to a downlink data communication transmitted to the UE, wherein the NACK is received using a resource that implicitly indicates the CSI.

17. The method of claim 16, wherein the CSI includes a channel quality indicator (CQI) value for the downlink data channel, and wherein the CQI value is identified based at least in part on the resource.

18. The method of claim 16, wherein the resource includes at least one of:
a number of resource blocks used for the NACK,
a cyclic shift used for the NACK,
a demodulation reference signal (DMRS) used for the NACK,
a set of data tones used for the NACK,
an index of a physical resource block used for the NACK,
an orthogonal cover code used for the NACK,
a hopping pattern used for the NACK, or
a combination thereof.

19. The method of claim 16, further comprising re-transmitting the downlink data communication based at least in part on the CSI.

20. A user equipment (UE) for wireless communication, comprising:
a memory; and
one or more processors coupled to the memory, the memory and the one or more processors configured to:
determine to report first channel state information (CSI), wherein the first CSI is associated with one or more first parameters that correspond to a first priority level and indicate a first service type and two or more of:
a reliability requirement associated with the first CSI,
a latency requirement associated with the first CSI,
a component carrier index associated with the first CSI,
whether the first CSI is periodic CSI or aperiodic CSI,
a subframe set associated with the first CSI, or
a CSI reporting type associated with the first CSI;
prioritize the first CSI over second CSI, associated with one or more second parameters that correspond to a second priority level and indicate a second service type, based at least in part on the first parameter one or more first parameters and the one or more second parameters, wherein the second service type is different from the first service type; and
transmit an indication of the first CSI and drop the second CSI based at least in part on prioritizing the first CSI over the second CSI.

21. The UE of claim 20, wherein the second service type includes an enhanced mobile broadband (eMBB) service type, and wherein the first service type includes an ultra-reliable low latency communications (URLLC) service type.

22. The UE of claim 20, wherein the CSI reporting type includes at least one of a channel quality indicator (CQI), a precoding matrix indicator (PMI), a CSI reference signal (CSI-RS) resource indicator (CRI), a strongest layer indicator (SLI), a rank indication (RI), a reference signal received power (RSRP) parameter, or some combination thereof.

23. The UE of claim 20, wherein the indication of the first CSI is transmitted and the second CSI is dropped based at least in part on a determination that a maximum supported payload size on an uplink resource at a maximum configured coding rate for transmission of CSI is less than a combined payload size of the first CSI and the second CSI.

24. The UE of claim 20, wherein:
the first services type is an ultra-reliable low latency communications (URLLC) service type,
the second service type is an enhanced mobile broadband (eMBB) service type,
the first CSI is associated with a higher reliability requirement or a lower latency requirement than the second CSI,
the first CSI is associated with a lower component carrier index than the second CSI, or
a combination thereof.

25. The UE of claim 20, wherein the first CSI is aperiodic CSI and the second CSI is periodic CSI.

26. The UE of claim 20, wherein the first CSI is periodic CSI and the second CSI is aperiodic CSI, and wherein the first service type is an ultra-reliable low latency communications (URLLC) service type and the second service type is an enhanced mobile broadband (eMBB) service type.

27. The UE of claim 20, wherein the first CSI is prioritized over the second CSI based at least in part on multiple parameters, associated with the first CSI and the second CSI, analyzed according to a sequence.

28. The UE of claim 20, wherein the first CSI includes a channel quality indicator (CQI) value for a downlink data channel.

29. A base station for wireless communication, comprising:
a memory; and
one or more processors coupled to the memory, the memory and the one or more processors configured to:
transmit, to a user equipment (UE), a request to report first channel state information (CSI), wherein the first CSI is associated with one or more first parameters that correspond to a first priority level and indicate a first service type and two or more of:
a reliability requirement associated with the first CSI,
a latency requirement associated with the first CSI,
a component carrier index associated with the first CSI,
whether the first CSI is periodic CSI or aperiodic CSI,
a subframe set associated with the first CSI, or
a CSI reporting type associated with the first CSI;

receive, from the UE, an indication of CSI; and determine that the indication includes the first CSI and excludes a second CSI, associated with one or more second parameters that correspond to a second priority level and indicate a second service type, based at least in part on the first priority level being higher than the second priority level, wherein the second service type is different from the first service type.

30. The base station of claim 29, wherein:

the first services type is an ultra-reliable low latency communications (URLLC) service type, the second service type is an enhanced mobile broadband (eMBB) service type, the first CSI is associated with a higher reliability requirement or a lower latency requirement than the second CSI, the first CSI is associated with a lower component carrier index than the second CSI, or a combination thereof.

* * * * *